US008666867B2

(12) United States Patent
Gibbs et al.

(10) Patent No.: US 8,666,867 B2
(45) Date of Patent: Mar. 4, 2014

(54) SYSTEMS AND METHODS FOR VALUATING FINANCIAL CONTRACTS AND ASSESSING ASSOCIATED RISK

(75) Inventors: Mark John Gibbs, Mill Bay (CA); Russell Goyder, Coquitlam (CA)

(73) Assignee: FinancialCAD Corporation, Surrey (CA)

( * ) Notice: Subject to any disclaimer, the term of this patent is extended or adjusted under 35 U.S.C. 154(b) by 35 days.

(21) Appl. No.: 13/571,197

(22) Filed: Aug. 9, 2012

(65) Prior Publication Data

US 2013/0031025 A1 Jan. 31, 2013

Related U.S. Application Data

(63) Continuation of application No. PCT/CA2011/050104, filed on Feb. 18, 2011.

(60) Provisional application No. 61/305,939, filed on Feb. 18, 2010.

(51) Int. Cl.
*G06Q 40/00* (2012.01)

(52) U.S. Cl.
USPC .......................................... 705/36 R; 705/37

(58) Field of Classification Search
USPC ..................................................... 705/35–40
See application file for complete search history.

(56) References Cited

U.S. PATENT DOCUMENTS

| 7,526,446 | B2 | 4/2009 | Aguais et al. |
| 7,552,076 | B1 | 6/2009 | Uenohara et al. |
| 7,555,454 | B2 | 6/2009 | Cooper et al. |
| 2001/0011243 | A1 | 8/2001 | Dembo et al. |
| 2002/0116236 | A1 | 8/2002 | Johnson et al. |
| 2004/0215551 | A1 | 10/2004 | Eder |
| 2006/0184482 | A1 | 8/2006 | Flinn et al. |
| 2007/0156555 | A1 | 7/2007 | Orr |
| 2009/0292567 | A1 | 11/2009 | Muller |
| 2010/0312530 | A1 | 12/2010 | Capriotti |
| 2013/0024342 | A1* | 1/2013 | Horowitz et al. ............ 705/35 |
| 2013/0117199 | A1* | 5/2013 | Arnott et al. ............ 705/36 R |
| 2013/0173494 | A1* | 7/2013 | Tayeb et al. ............ 705/36 R |

FOREIGN PATENT DOCUMENTS

WO 2010000487 1/2010

* cited by examiner

*Primary Examiner* — Thu Thao Havan
(74) *Attorney, Agent, or Firm* — Oyen Wiggs Green & Mutala LLP

(57) ABSTRACT

Systems and methods valuate financial contracts and assess associated risk. Particular embodiments comprise: calibrating parameters of models based on market data; determining a metric for the risk of the models to changes in the parameters; determining a metric for the risk of the parameters to changes in the market data; generating a set of valuation functions corresponding to the contract and depending on the calibrated parameters of the models; generating a corresponding set of derivatives of the valuation functions, the derivatives depending on the metric for the risk of the parameters to changes in the market data; determining a value for the contract to comprise an expected value of one of the valuation functions; and assessing a risk of the value of the contract to one or more variables by determining an expected value of one or more of the set of derivatives of the valuation functions.

59 Claims, 13 Drawing Sheets

SYSTEMS AND METHODS FOR VALUATING FINANCIAL CONTRACTS AND ASSESSING ASSOCIATED RISK

RELATED APPLICATIONS

This application is a continuation of PCT application No. PCT/CA2011/050104 (published under WO2100/100846) having an international filing date of 18 Feb. 2011 which in turn claims priority from U.S. application No. 61/305,939 filed 18 Feb. 2010. PCT application No. PCT/CA2011/050104 (published under WO2100/100846) and U.S. application No. 61/305,939 are hereby incorporated herein by reference.

TECHNICAL FIELD

The invention relates to systems and methods for valuating financial contracts and for assessing the risk associated with such contracts.

BACKGROUND

There is a desire to value financial contracts. Some financial contracts are relatively simple. Simple contracts can be relatively easy to value. For example, a contract where party A loans party B US $100 today and party B agrees to pay back the US $100 plus 5% interest in 1 year may be viewed (from the perspective of party A) as a cash outflow of US $100 at time t=0 and a cash inflow of US $105 at a time t=1 year. The present value of a such future cash flow can be valued according to the well known present value equation $$NPV = \sum_{t=1}^{T} \frac{R_t}{(1+r)^t} - R_0 \quad (1)$$

where: $R_0$ is the initial investment at time t=0; t is a time of a cash flow; $R_t$ is the amount of the cash flow at time t (positive for incoming cash flows and negative for outgoing cash flows); T is the time horizon under consideration; and r is the discount rate. If the net present value (NPV) of a contract is NPV>0, then it would be an attractive contract; if NPV<0, then the contract is unattractive; and if the NPV=0, then a party would be indifferent to the contract.

In the example case described above, the initial investment is $R_0$=$100 and the return at t=T=1 year is $R_1$=$105. Assuming that party A can borrow the US $100 at the same 5% rate, then the discount rate r in equation (1) may be set to r=0.05 which results in NPV=0. This is expected, since party A would be indifferent to receiving $105 in 1 year if it also had to pay back $105 in 1 year. However, if party A could borrow money at 4%, the discount rate r in equation (1) may be set to r=0.04. Assuming that party A could still arrange a contract with party B to loan party B $100 today and to receive $105 in a year, then the NPV of such a contract would NPV=$0.96 which makes the contract attractive to party A.

The NPV of the contract does not tell the whole story, however, as the NPV assumes that certain market data is fixed. For example, the example case described above assumes that the rate at which party A can borrow money is fixed for the entire year and this assumption is reflected in the constant discount rate r. In reality, however, market data can fluctuate and there is associated risk that the NPV of a financial contract can vary with fluctuations in market data. For example, the rate at which party A is paying interest on borrowed money (which is used for the discount rate r in equation (1)) could increase in middle of the contract. In addition to the NPV of a contract, it is therefore desirable to know the dependence of the NPV on changes to market data or, in other words, the risk that the NPV will change in response to corresponding changes in market data.

In the case of the simple example contract, the risk associated with a change in the rate that party A can borrow money (as reflected in the discount rate r) may be expressed as the amount of change in the NPV (∂NPV) for a small change in the discount rate r (∂r) and may be estimated using the derivative $$\frac{\partial(NPV)}{\partial r}$$

of the NPV equation (1).

In many cases, financial contracts are considerably more complex than the aforementioned example. In such cases, it can be considerably more difficult to valuate the financial contract and can be correspondingly more difficult to evaluate the risk of the contract valuation on changes in market data. There is a desire to value financial contracts and to evaluate the risk associated with such contracts regardless of their complexity.

BRIEF DESCRIPTION OF DRAWINGS

In drawings which illustrate non-limiting embodiments.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments of the invention provide systems and methods for valuating financial contracts and for assessing the risk associated with such contracts. Particular embodiments provide methods for valuating a financial contract and assessing its associated risk, the methods comprising: calibrating parameters of one or more models based on market data; determining a metric for the risk of the one or more models to changes in the parameters; determining a metric for the risk of the one or more parameters to changes in the market data; generating a set of valuation functions corresponding to the contract, one or more of the valuation functions depending at least in part on the calibrated parameters of the one or more models; generating a corresponding set of derivatives of the valuation functions, one or more of the derivatives depending at least in part on the metric for the risk of the one or more parameters to changes in the market data; determining a value for the contract to comprise an expected value of one or more of the valuation functions; and assessing a risk of the value of the contract to one or more variables by determining an expected value of one or more of the set of derivatives of the valuation functions.

Financial contracts typically involve flows of cash and/or securities (or other assets) at some date in the future. Such future flows may be contingent on various factors, quantities or the like that are not observable at the current time. Accordingly, the nature of financial contracts gives rise to uncertainty in their current values and associated risk and corresponding desires to model these uncertainties.

Figure 1:
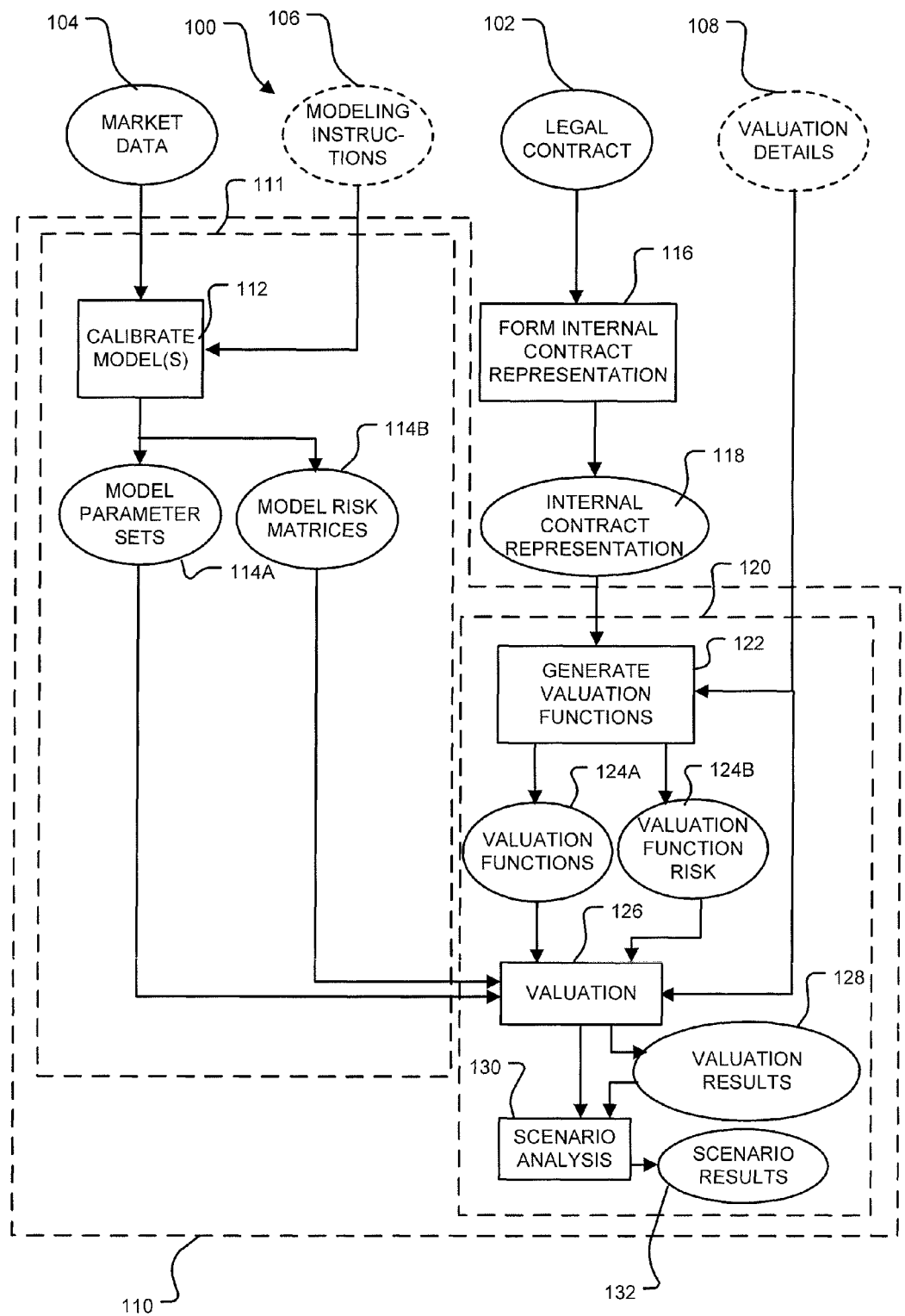
FIG. 1 is a block diagram depiction of a method for valuating financial contracts and for assessing the risk associated with such contracts according to a particular embodiment.

FIG. 1 is a block diagram depiction of a method 100 for valuating financial contracts and for assessing the risk associated with such contracts according to a particular embodiment. Method 100 may be performed at least in part by a suitably programmed computer system 110—shown in FIG. 1 using dashed lines. In general, method 100 may be used to evaluate any suitable financial contract and to assess the risk associated with any such financial contract. For the purposes of explaining method 100, this description makes use of a number of non-limiting example financial contracts. These example contracts are intended to be explanatory in nature and not to limit the scope of the systems and methods described herein. In particular, some methods, systems, parameters, models and the like used for these exemplary financial contracts will not be the same as methods, systems, parameters, models and the like used for other financial contracts. Those skilled in the art will understand that other methods, systems, parameters, models and the like could be used within the systems and methods described herein for other financial contracts.

Valuation and risk assessment method 100 has two principal inputs: legal contract 102; and market data 104. Legal contract 102 describes the legal terms of the financial contract to be evaluated. Typically, legal contract 102 describes the financial contract in terms of the parties' rights and obligations. The rights and obligations of interest for method 100 are primarily financial rights and obligations. Rights in legal contract 102 typically provide a party with an opportunity (but not an obligation) to do something and may be relatively straightforward and/or complex and may be conditional or unconditional. By way of non-limiting example, rights specified by legal contract 102 may include: a right to receive certain assets (e.g. a right to receive interest payments at r % on a principal P receivable on the first of each month in Japanese yen if r>5% and P>US $100,000 or to receive nothing if on the first of each month r≤5% or P≤US $100,000); and/or a right to take certain actions (e.g. a right to exercise an option to purchase 1 share of Acme stock at a price of US $100 on the date 1 Feb. 2011). Legal contract 102 may also include obligations. Such obligations typically require a party to do something and may be relatively straightforward and/or complex and may be conditional or unconditional. By way of non-limiting example, obligations specified by legal contract 102 may include: an obligation to give up assets (e.g. an obligation to pay a price P in euros for purchasing an option, wherein the price P is calculated according to P=100+100(r)(n) where r is the US federal reserve rate and n is the duration of the option); and/or an obligation to take certain actions (e.g. an obligation to sell 10,000 shares of Acme stock at a price of US$100 on a specific date).

For the purposes of explaining method 100, this description will make use of two non-limiting example legal contracts 102.

Contract A: an option (i.e. the right (but not the obligation)) to purchase 1 share of Acme stock at a price of US $100 on a date of 4 Mar. 2011.

Contract B: a callable equity-linked swap having two "rolls" taking place on 15 Mar. 2011 and 15 Mar. 2012. Each roll involves: payment of 12 months of interest in US dollars on a notional principal of US $10,000,000 at the London Interbank Offered Rate (LIBOR) on a specified pay date; and receipt of a "total return" of Acme Inc. stock on the pay date capped at 10% and floored at 0%. Contract B also assumes that the other party to the contract can call (terminate) the contract on 15 Sep. 2011. The "total return" of the Acme Inc. stock for the purposes of contract B is defined as $$\text{total return} = \frac{\text{stock price on end date}}{\text{stock price on start date}} - 1.$$

Contract B also assumes that the stock fixing delay is 3 business days in New York, the LIBOR fixing delay is 2 business days in both London and New York and the start and end dates of the contract are respectively 15 Mar. 2010 and 15 Mar. 2012 with the first roll ending at the payment date of 15 Mar. 2011 and the second roll concluding the contract on the payment date of 15 Mar. 2012. The relevant dates for the first and second rolls are as follows:

| Relevant Dates | Roll #1 | Roll #2 |
| --- | --- | --- |
| stock "start" date | 10 Mar. 2010* | 10 Mar. 2011+ |
| stock "end" date | 10 Mar. 2011** | 12 Mar. 2012++ |
| LIBOR "start" date | 15 Mar. 2010 | 15 Mar. 2011+++ |
| payment date (LIBOR "end" date) | 15 Mar. 2011 | 15 Mar. 2012 |
| LIBOR fixing date | 11 Mar. 2010*** | 11 Mar. 2011++++ |

*15 Mar. 2010 LIBOR start date less 3 business days in New York for stock price fixing delay;
**15 Mar. 2011 payment date less 3 business days in New York for stock fixing delay;
***15 Mar. 2010 LIBOR start date less 2 business days in New York and London for LIBOR fixing date;
+the 15 Mar. 2011 LIBOR start date of the second roll less 3 business days in New York for stock fixing delay;
++15 Mar. 2012 payment date less three business days in New York for stock fixing delay; and
+++The LIBOR accrual period in 2012 is 366 days because of a leap year;
++++15 Mar. 2011 start date of the second roll less two business days in both London and New York for LIBOR fixing delay.

It will be appreciated that these legal contracts 102 are non-exhaustive and are used for the purposes of explanation. In general, legal contracts 102 may be considerably more complex than the example contracts described herein and may include a wide variety of different rights and obligations.

Market data 104 input to method 100 includes financial data available from the market, including, by way of non-limiting example, variables that can be known or ascertained with a relative degree of certainty (e.g. the US federal reserve rate or the 1 year US treasury bill rate) and variables that can exhibit some degree of fluctuation (e.g. the rate for which US dollars may be exchanged for Japanese yen and quotes for 1 year options to purchase Acme stock (which may be different from different sources). Market data 104 may also include user-specified data. In general, market data 104 can include any historical data that is observable in the market up to and including date of the contract valuation (e.g. the date on which the block 126 valuation is performed as discussed in more detail below). Market data 104 may expressly include the values of other financial contracts. The financial contracts included within market data 104 may include the types of financial contracts which are commonly traded in the financial marketplace. For example, a contract for a 1 year guaranteed investment certificate (GIC) issued by bank X. Financial contracts included in market data 104 may also include more complex financial contracts, such as financial contracts sufficiently complex that it may be desirable to valuate such contracts using method 100 (i.e. such financial contracts could be legal contract 102 of FIG. 1).

Many of the types of financial contracts that make up market data 104 are quoted in terms of internal contractual parameters. For example, the cost of borrowing US $1,000 for 2 years may be quoted in terms of an interest rate parameter i % and a frequency (e.g. annually) with which the interest is payable or compounded. In such cases, market data 104 may comprise such internal contractual parameters. Other non-limiting examples of market data 104 that could be used include: cash loan interest rates, interest rate swaps (e.g. where one party pays a floating rate and the other pays a fixed rate), interest rate futures, bond futures, government bonds, interest rate caps and floors, swaptions (e.g. an option to enter into a swap), stock prices, FX rates, commodity prices, commodity swaps, indices (e.g. stock market indices), repurchase agreements, options on a variety of assets, volatility and variance swaps, credit default swaps, basis swaps, single tranche collateralized debt obligations (CDOs), and/or the like.

Market data 104 may also include direct model inputs and direct model parameter inputs. These direct inputs may particularly specify a model value (in the case of direct model inputs) and/or a model parameter value (in the case of direct model parameter inputs). For simplicity, these direct inputs are included in the notion of market data 104 even though these direct inputs may or may not be based on information actually obtained or obtainable from the market. Direct inputs that form part of market data 104 may comprise user-configurable data and be based on past experience or based on a user's desire to understand the impact of the model parameter value or the model value on the valuation of contract 102. For example, a user may want to particularly specify a fixed discount rate of r % or a fixed currency exchange rate (FX) between Canadian dollars and US dollars of CAD-US=fx. In these cases, the discount rate r % may be specified as a direct model parameter input of the discount rate model and the CAD-USD exchange rate may be specified as a direct model input.

In general, market data 104 may be obtained from a number of sources (not expressly shown). Market data 104 may be manually input into computer system 110. Market data 104 may additionally or alternatively be automatically retrieved by (or otherwise input into) computer system 110 from external sources via suitable communications link(s) (e.g. the internet or the like) or I/O devices. By way of non-limiting example, some market data 104 (e.g. the closing Dow Jones index or the closing price of oil as quoted by the New York Stock Exchange in US dollars per barrel on a given day) or the like may be published on a daily basis on one or more websites, bulletin boards, network resources (e.g. feeds from financial exchanges) or the like. In such cases, computer system 110 may be configured (via suitable programming) to poll such information sources and to download (or otherwise obtain) market data 104 from such information resources via a suitable communications link or I/O device. In other cases, other information resources (not shown) may be configured (via suitable programming) to initiate communications with computer system 110 and to upload market data 104 into computer system 110.

For the particular case of example contract A, we will assume that market data 104 includes (without limitation) the following information:
(i) the interest rate quote r for a 1 year loan is r=5% payable (or compounding) on an annual (365 day) basis;
(ii) the current share price $q_1$ to purchase 1 share of Acme Inc. stock is $q_1$=US $98;
(iii) the expected rate of dividend $q_2$ for 1 share of Acme Inc. stock for any time horizon is $q_2$=2.9%; and
(iv) the Black volatility $q_3$ of 2 year call option on Acme stock with a strike of US $100 is $q_3$=10%.

Those skilled in the art of mathematical finance will appreciate that the Black volatility of an option is a parameter of the so-called Black Scholes model or Black Scholes formula for options on an equity. The Black Scholes model represents one non-limiting example of a model for the future price of an option on an equity which assumes that the future price of the stock is log-normally distributed. Financial markets often quote options using the Black volatility metric in addition to other factors such as the strike price, the exercise date (or the time remaining in the option) and the stock underlying the option. Traders in such options will also be able to avail themselves of other information (market observables), such as the current share price of the stock underlying the option and the expected dividend yield of the stock underlying the option.

For the particular case of example contract B, we will assume that market data 104 includes the following information:
(i) all of the same market data 104 as for contract A;
(ii) the Black volatility $q_4$ of a 2 year rate cap contract having two rolls, each with a 5% strike on the USD 12 month LIBOR rate is quoted at $q_4$=15%;
(iii) the mean reversion $\alpha=q_5$ of the Hull-White model for future interest rates is a direct model parameter input set at $\alpha=q_5$=5% and the short rate volatility $\sigma=q_6$ of the Hull-White model is unspecified, but will be determined from the rate cap market data as explained in more detail below;
(iv) a hybrid correlation $q_7$ between a forward interest rate and a forward stock price is a direct model parameter input set at $q_7$=−30%.

Those skilled in the art of mathematical finance will appreciate that a rate cap contract represents a type of derivative wherein the contracting party will receive the difference between a floating interest rate (e.g. the USD 12 month LIBOR rate) and the cap strike price (e.g. 5%) at the end of each period (e.g. annually). Typically, the floating interest rate will be fixed at a particular fixing date (also referred to as an expiry date) for each period. The rate cap contract may be understood to be like a series of call options (one for each period) over the duration of the contract. The rate cap contract quoted in market data 104 for example contract B has two annual rolls and therefore may be thought of as a series of two options. If we assume that the two options have option exercise and LIBOR fixing dates of 11March2010 and 11March2011 and are payable at 15March2011 and 15March2012 respectively, then this rate cap contract may be viewed as two call options which involve payouts of:
(i) N·δ·MAX(USD_LIBOR_12 months[11March2010]-5%,0) payable on 15March2011;
(ii) N·δ·MAX(USD_LIBOR_12 months[11March2011]-5%,0) payable on 15March2012
wherein N is the notional amount of the contract and δ is the so called accrual fraction (i.e. the fraction of the accrual period for which the rate is to be paid). Rate cap contracts are typically quoted in terms of the Black volatility in accordance with the Black-Scholes model corresponding to forward interest rates. In the case of the rate cap contract in market data 104 for example contract B, the Black volatility is quoted to be $q_4$=15%. The value of a rate cap contract can be determined by: (i) parsing the rate cap contract into its constituent options; (ii) using the expected forward price of the rate and the Black volatility quote to determine the expected forward value for each option on its payout date; (iii) multiplying the expected forward value for each option by the nominal value, by its accrual fraction and by the discount factor between its payout date and the valuation date to obtain its expected value at the valuation date; and (iv) adding up the expected values of constituent options at the valuation date to arrive at the total expected value of the rate cap contract at the valuation date. There is a one to one correspondence between the Black volatility quote and the value of the rate cap contract. Consequently, rate cap contracts are typically quoted in terms of their Black volatilities or Black vols.

The Hull-White model is a simple and non-limiting example of a model known to those skilled in the art of mathematical finance which may be used to model uncertainty in future rates at a future time t=b based on knowledge of the term structure of rates at an initial time t=a where b>a. The Hull-White model may be described in terms of three parameters, referred to as the volatility of the short rate σ, the mean reversion α and an underlying non-stochastic discount function $D_{HW}(t)$. In the case of the market data 104 for example contract B, the Hull-White mean reversion α=$q_5$ is specified as a direct model parameter input α=$q_5$=5% and the volatility of the short rate $q_6$=σ is initially unspecified, but will be calibrated as described further below. The underlying non-stochastic discount function $D_{HW}(t)$ for the Hull-White model may generally comprise any discount function, as also explained in more detail below.

The hybrid correlation is one non-limiting example a function known to those skilled in the art which may be used to express the negative correlation between stochastic forward stock prices (X) and stochastic forward discount factors (Y). For a forward stock price that is a random process having a value X, an expected value $\mu_x$ and a standard deviation $\sigma_x$ and a forward discount factor that is a random process having a value Y, an expected value $\mu_y$ and a standard deviation $\sigma_y$, a simple model for this negative hybrid correlation is given by:

$$\text{corr}(X, Y) = \frac{E[(X - \mu_x)(Y - \mu_y)]}{\sqrt{E[(X - \mu)^2]}\sqrt{E[(Y - \mu_y)^2]}} = \frac{E[(X - \mu_x)(Y - \mu_y)]}{\sigma_x \sigma_y} \quad (2)$$

where E is the expected value operator. In the case of the market data 104 for example contract B, this hybrid correlation is specified as a direct model parameter input to be corr(X,Y)=$q_7$=−30%.

Returning to FIG. 1, method 100 comprises two main branches which are shown in the illustrated schematic of FIG. 1. Model formation branch 111 involves using market data 104 to develop one or more models (as specified by modeling instructions 106) and to estimate one or more corresponding model parameter sets 114A and one or more corresponding model risk matrices 114B. Contract valuation branch 120 involves deriving a set of valuation functions 124A and associated risk functions 124B corresponding to legal contract 102 and using these valuation functions 124A and risk functions 124B (together with the model parameter sets 114A and corresponding model risk matrices 114B) obtained in model formation branch 111) to valuate legal contract 102 and to assess the risk associated with same. We first consider model formation branch 111 in more detail and then provide a description of contract valuation branch 120.

Model formation branch 111 comprises block 112 which involves using market data 104 and one or more models specified by modeling instructions 106 to develop one or more models and to output one or more corresponding model parameter sets 114A and one or more corresponding model risk matrices 114B. The block 112 procedure may be referred to as model calibration. The inputs to block 112 comprise market data 104 and modeling instructions 106.

Modeling instructions 106 may comprise mathematical or functional definitions of one or more financial models, each financial model defined in terms of (e.g. a function of) a corresponding parameter set. In some cases, one or more parameters of a higher order model may comprise the outputs of (or the parameters of) other sub-models. The financial models defined by modeling instructions 106 may be representative of (e.g. useable to model) various financial contracts and, in particular, may be representative of financial contracts associated with market data 104.

For each financial model, modeling instructions 106 may also comprise a set of mathematical or functional definitions of the model's various partial derivatives. For a particular financial model, such partial derivatives may include:
(i) partial derivatives of the particular financial model function with respect to each of the parameters in its corresponding parameter set;
(ii) partial derivatives of the parameters of the particular financial model function with respect to market quotes that form part of market data 104;
(iii) partial derivatives of the particular financial model with respect to other models; and
(iv) partial derivatives of the parameters of the particular financial model function with respect to other models.

The outputs of block 112 (method 200) comprise one or more sets of model parameters 114A and one or more corresponding model risk matrices 114B. Each set of model parameters 114A comprises a set of values for the model parameters associated with a corresponding one of the models provided by modeling instructions 106. Once calibrated in block 112, a model parameter set 114A for a particular model allows the model to accurately reflect market data 104. Each corresponding model risk matrix 114B comprises a set of values for the set of partial derivatives associated with a corresponding one of the models provided by modeling instructions 106. Once calibrated in block 112, the partial derivatives of a model risk matrix 114B for a particular model provide a first order prediction of the risk of the particular model to variation in a corresponding parameter, to variation in the market quotes that form market data 104 and to variation in the values of other models.

Each of the financial models defined by modeling instructions 106 may typically be specified as a function of time and one or more corresponding model parameters. By way of non-limiting example, a model specifying the discount rate for a unit of cash at a future time t could be provided by:

$$D(t)=e^{-q_0 t} \quad (3)$$

To the extent that the equation (3) model holds for a time t under consideration, the equation (3) model is specified by the single parameter $q_0$. The partial derivatives for the equation (3) discount model may be used to model the risk of the equation (3) model to its parameters (in this case the equation (3) model has only one parameter ($q_0$)). The partial derivative for the equation (3) model with respect to its parameter $q_0$ is given by:

$$\frac{\partial D}{\partial q_0} = (-t)e^{-q_0 t} = (-t)D \quad (4)$$

Another non-limiting example of a financial model which may be defined by modeling instructions 106 includes a model associated with the forward price of a stock at a time t given an expected rate of continuous dividend payments per annum. Such a model may be defined, for example, by the equation:

$$F(t) = \frac{S e^{q_2 t}}{D_F(t)} = \frac{q_1 e^{q_2 t}}{D_F(t)} \quad (5)$$

where:
  $S=q_1$ is the current share price of the stock;
  $q_2$ is the expected rate of continuous dividend payments per annum; and
  $D_F(t)$ is the underlying discount function for the forward price model.

In the equation (5) model, the parameter set includes the parameters $\{q_1, q_2 \text{ and } D_F(t)\}$. In the case of the illustrative example contracts A and B, market data 104 provides a direct quote (i.e. a direct model parameter input) of the current Acme share price $q_1=\$98$ and a direct quote of the dividend rate for Acme stock $q_2=2.9\%$. In general, discount function $D_F(t)$ underlying the equation (5) model maybe any discount function, including the equation (3) discount function D(t) for example. In the remainder of this description, it will be assumed (for simplicity) that the discount factor underlying the equation (5) forward price model is the equation (3) discount function (i.e. $D_F(t)=D(t)$), although this is not necessary. With this assumption, the equation (5) future price model represents an example of a higher order model whose parameter set $\{q_1, q_2, D_F(t)=D(t)\}$ includes the model function D(t) of the lower order equation (3) sub-model which is in turn defined by its own parameter set $\{q_0\}$. Various embodiments should be understood to expressly include models/parameter sets that depend on other models/parameter sets.

The partial derivatives for the equation (5) forward price model with respect to its parameters $q_1$, $q_2$ and $D_F(t)=D(t)$ are given by:

$$\frac{\partial F}{\partial q_1} = \frac{e^{q_2 t}}{D} = \frac{F}{q_1} \quad (6a)$$

$$\frac{\partial F}{\partial q_2} = t \frac{q_1 e^{q_2 t}}{D} = tF \quad (6b)$$

$$\frac{\partial F}{\partial D} = -\frac{q_1 e^{q_2 t}}{D^2} = -\frac{F}{D} \quad (6c)$$

Here it may be noted with interest that equation (4) may be combined with equation (6c) to yield an expression relating the risk of the equation (5) future price to the discount rate $q_0$ used in the equation (3) discount model:

$$\frac{\partial F}{\partial q_0} = \frac{\partial F}{\partial D} \frac{\partial D}{\partial q_0} = tF \quad (6d)$$

Typically, however, equation (6d) will not be explicitly included in the partial derivatives associated with the equation (5) model, since equations (4) and (6c) are known and equation (6d) can be determined from the combination of equations (4) and (6c).

Another non-limiting example of a financial model which may be defined by modeling instructions 106 includes a model associated with the uncertainty of the forward price F(t) of a stock at a future time t. One such model is the so-called Black-Scholes model which assumes that the forward price F(t) of the stock is log-normally distributed with a mean $\mu(t)$ and a deviation $\sigma(t)$. In the case of the illustrative example contracts (contract A and contract B) described above, market data 104 includes a direct quote (i.e. direct model parameter input) of the Black-Scholes deviation (volatility) $\sigma$ for a 2 year call option for shares of Acme Inc. —i.e. $\sigma=q_3=10\%$. If we assume that the Acme stock follows the Black-Scholes model and that the Black-Scholes volatility of the price of Acme stock is constant, then a model for the deviation $\sigma(t)$ of the forward price F(t) of Acme stock at future time t is given by:

$$\sigma(t)=\sigma=q_3=10\% \quad (7)$$

where $\sigma=q_3$ is the Black volatility quote for the call option for shares of Acme Inc.

The partial derivative for the equation (7) volatility model with respect to its parameter $q_3$ is given by:

$$\frac{\partial \sigma}{\partial q_3} = 1 \quad (8)$$

Another non-limiting example of a financial model which may be defined by modeling instructions 106 includes the Hull-White model discussed briefly above which may be used to model uncertainty in future rates (e.g. interest rates, discount rates or the like) at a future time t=b based on knowledge of the term structure of the rates at an initial time t=a where b>a. The Hull-White model may be described in terms of three parameters, referred to as the mean reversion $q_5=\alpha$; the volatility of the short rate $q_6=\sigma$ and an underlying non-stochastic discount function $D_{HW}(t)$. For the case of the illustrative example contracts (contract A and contract B) described above, market data 104 is assumed to include a direct model parameter input specifying a mean reversion of $\alpha=q_5=5\%$ and the short rate volatility $\sigma=q_6$ of the Hull-White model is initially unspecified, but will be calibrated as described further below. The underlying non-stochastic discount function $D_{HW}(t)$ for the Hull-White model may generally comprise any discount function, including (for example), the equation (3) discount function D(t). For simplicity in the remainder of this description, it will be assumed that the underlying non-stochastic discount function $D_{HW}(t)$ for the Hull-White model is the equation (3) discount function D(t)– i.e. $D_{HW}(t)=D(t)$, although this is not necessary. Again, with this assumption, the Hull-White future rate model represents an example of a higher order model whose parameter set $\{q_5, q_6, D_{HW}(t)=D(t)\}$ includes the model function D(t) of the lower order equation (3) sub-model which is in turn defined by its own parameter set $\{q_0\}$. In general, the Hull-White model may be described by two functions $A(a,b,\alpha=q_5,\sigma=q_6)$ and $B(a,b,\alpha=q_5,\sigma=q_6)$. Modeling instructions 106 may also include the partial derivatives of the Hull-White model with respect to its parameters $q_5=\alpha$, $q_6=\sigma$ and $D_{HW}(t)=D(t)$. For the sake of avoiding unnecessary complexity, the Hull-White model functions and their partial derivatives are not described in detail here.

Another non-limiting example of a financial model which may be defined by modeling instructions 106 includes a model associated with the uncertainty of the forward price of rates (e.g. discount rates or interest rates) at a future time t. One such model is the so-called Black-Scholes model which assumes that the forward price of the rate is log-normally distributed with a mean $\mu(t)$ and a deviation $\sigma(t)$. In the case of the illustrative example contracts (contract A and contract B) described above, market data 104 includes a direct quote (i.e. direct model parameter input) of the Black-Scholes deviation (volatility) a for a 2 year rate cap contract—i.e. $a=q_4=15\%$. If we assume that the LIBOR interest rate will follow the Black-Scholes model and that the Black-Scholes volatility of the LIBOR rate is constant, then a model for the deviation a(t) of the LIBOR rate at future time t is given by:

$$\sigma(t)=\sigma=q_4=15\% \qquad (9)$$

where $\sigma=q_4$ is the Black volatility for the rate cap contract.

The partial derivative for the equation (9) volatility model with respect to its parameter $q_4$ is given by:

$$\frac{\partial \sigma}{\partial q_4}=1 \qquad (10)$$

Another non-limiting example of a financial model which may be defined by modeling instructions 106 includes the hybrid correlation model provided by equation (2) which relates forward stock prices (X) modeled by a random process to discount factors (Y) modeled by a random process. In the case of the market data 104 for example contract B, this hybrid correlation is specified as a direct model parameter input to be $corr(X,Y)=q_7=-30\%$.

Modeling instruction 106 may also include the partial derivatives of the hybrid correlation model with respect to X and Y. As discussed above, however, X is the forward price of Acme stock which is itself modeled by the equation (5) function for the forward stock price F(t) and thus the partial derivative of corr(X,Y) with respect to X may refer to the partial derivatives of equation (6a)-(6c) and ultimately to equation (6d). Similarly, Y is the discount factor which output from the Hull-White model discussed above and thus the partial derivative of corr(X,Y) with respect to Y may refer to the partial derivatives of the Hull-White model as described above. For the sake of avoiding unnecessary complexity, these partial derivatives are not described in detail here.

The above described example models and corresponding partial derivatives are meant to be illustrative and not exhaustive of the types of financial models which may be defined by modeling instructions 106 and used in method 100. In addition to the models described above, examples of suitable models which may be defined by modeling instructions 106 and used with method 100 include, without limitation, Black-Scholes models, normal models, shifted log-normal models, Heston models, constant elasticity variance (CEV) models, stochastic alpha, beta, rho (SABR) models, Levy models, affine jump diffusion models, Hull-White models, LIBOR market models, Vasicek models, Black-Karasinski models and/or the like. Models defined by modeling instructions 106 and used by method 100 may include, without limitation, models which provide some indication of future probabilities; models which predict possible prices of assets in the future; models which predict possible rates (e.g. interest rates) in the future; models which correlate (or jointly model) future prices of assets and future rates; models which predict future probabilities of the occurrence of a single credit event (such as default), or multiple credit events and associated consequences such as the amount of loss due to defaults in a portfolio of entities; or combinations thereof.

Figure 2:
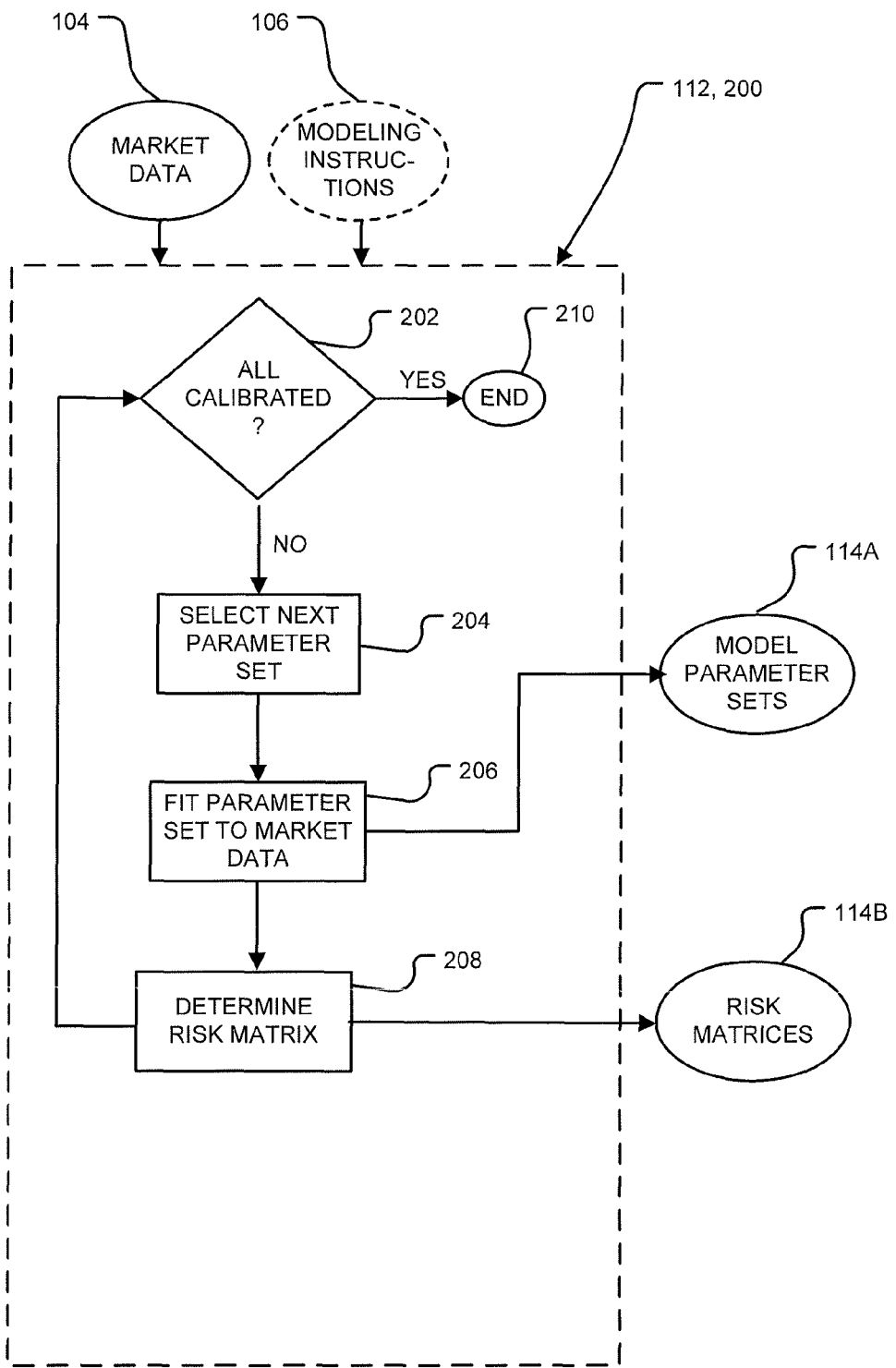
FIG. 2 is a block diagram depiction of a method for model calibration suitable for use with the FIG. 1 valuation method according to a particular embodiment.

As mentioned briefly above, block 112 involves calibrating one or more models defined by modeling instructions 106. The block 112 calibration involves, for each model, determining a set of parameter values such that the model can be used to predict market data 104 with a reasonable degree of accuracy and outputting these parameter values as: a set of calibrated model parameters 114A; and a corresponding model risk matrix 114B comprising partial derivatives of the model evaluated with the calibrated model parameters. FIG. 2 schematically depicts a method 200 suitable for implementing the block 112 model calibration procedure according to a particular embodiment. Method 200 commences with evaluation of a loop exit condition in block 202. The block 202 loop exit condition involves an inquiry into whether all of the models provided in modeling instructions 106 (or at least all of the models necessary to evaluate contract 102) are calibrated. In a first iteration, the block 202 evaluation will generally be negative and method 200 will proceed to block 204 which involves selecting the next model or, equivalently, selecting the next parameter set to be calibrated. In block 206, a curve fitting process is applied to the current parameter set to determine values for the parameters of the current model that best predict available market data 104.

Figure 3:
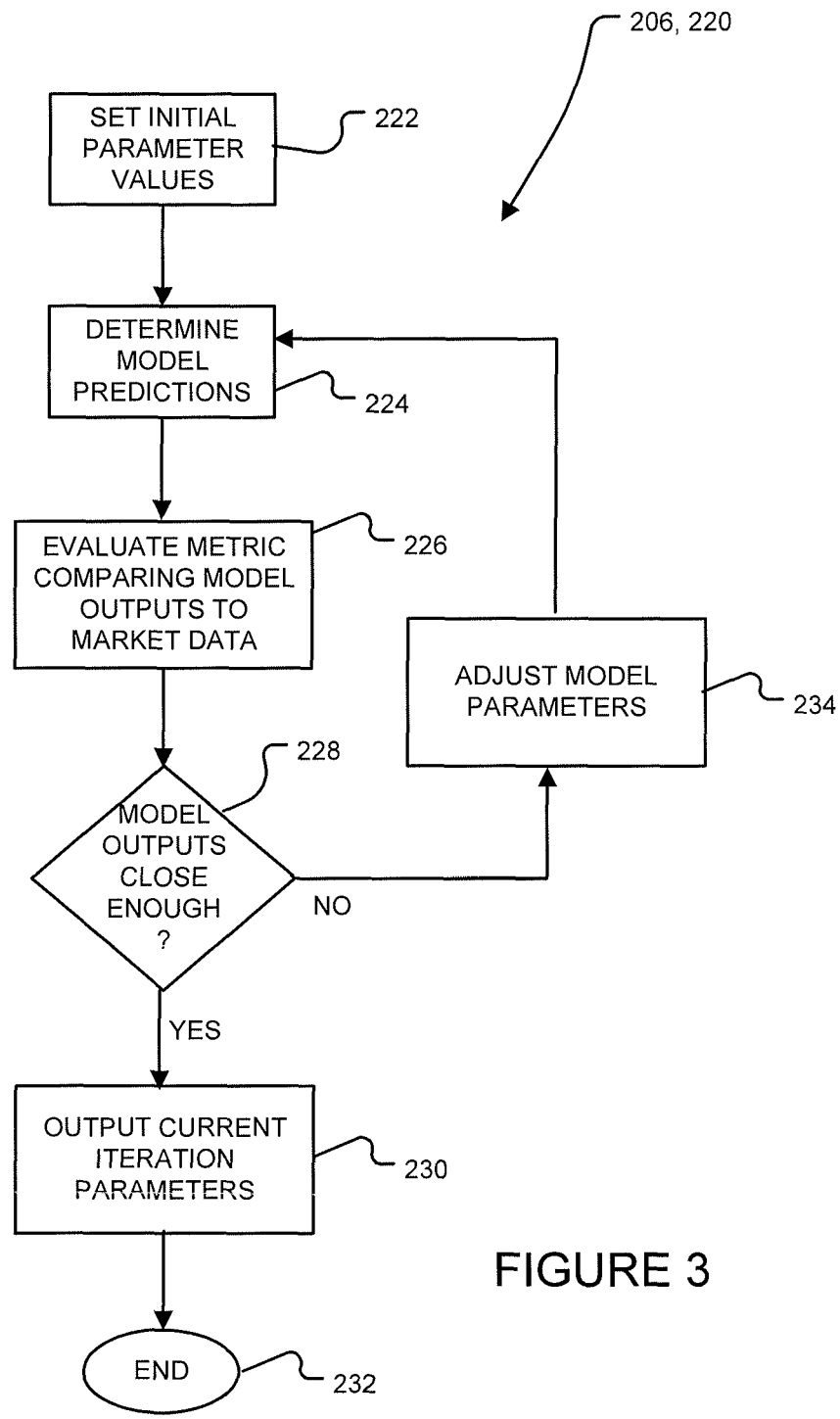
FIG. 3 is a block diagram depiction of a method for fitting a model/parameter set to observable market data to determine values for the parameters of the model.

Curve fitting techniques are well known to those skilled in the art. A non-limiting example of a curve fitting method 220 suitable for use in block 206 is shown in FIG. 3. Curve fitting method 220 starts in block 222 which involves taking an initial guess as to the values of the parameters for the current model/parameter set. Method 220 then proceeds to block 224 which involves using the current parameter values together with the model to determine one or more model output predictions. The block 224 model output predictions may be evaluated at data points corresponding to known or observable market data 104. For example, if risk-free interest rates are observable within market data 104 for 1, 3 and 5 years loans a model used to predict a discount factor may be evaluated at data points corresponding to 1, 3 and 5 years. Method 220 then proceeds to block 226 which involves evaluation of a cost function or some other metric for comparing the block 224 model predictions to observable market data 104. A non-limiting example of a suitable metric usable in block 226 comprises a sum of least squares cost function which involves a summation of the squares of the differences between the block 224 model predictions and the corresponding market data 104 at known data points.

Method 220 then proceeds to block 228 which involves an evaluation of whether the block 224 model predictions are close enough to the observable market data 104 to conclude that the current values of the parameters are acceptable. In some embodiments, the block 228 evaluation may involve comparing the block 226 metric to a threshold value. In some embodiments, the block 228 evaluation may involve comparing the number of iterations through the loop of blocks 224, 226, 228, 234 to a threshold value. These threshold values may be constant, model-dependent and/or user-configurable. In some embodiments, the block 228 evaluation may be usercontrolled—e.g. a user may cause the block 228 evaluation to be positive such that method 220 exits the loop of blocks 224, 226, 228, 234 using the current parameter values.

If the block 228 evaluation is negative (block 228 NO output), then method 220 proceeds to block 234 which involves adjusting one or more of the parameter values before looping back through blocks 224, 226, 228 again. Block 234 may involve a variety of different schemes for adjusting one or more of the parameter values of the current model. If the block 228 evaluation is positive (block 228 YES output), then method 220 proceeds to block 230 which involves outputting the current parameter values as the model parameter set 114A for the current model (see FIG. 2). Method 220 then ends in block 232.

Method 220 represents one particular and non-limiting example of a curve-fitting technique suitable for use in block 206 of method 200. Those skilled in the art will appreciate that there are a large variety of other curve fitting techniques which may be suitable for use in block 206. By way of non-limiting example, such other curve fitting techniques may comprise: variations in the block 226 metric used to compare the model outputs to the market data 104 observables; variations in the block 228 valuation criteria; variations in the scheme and/or amount by which one or more of the model parameters are adjusted in block 234. The schemes for adjusting one or more parameter values in block 234 may comprise techniques which involve adjusting the one or more parameter values in a manner which would tend to reduce the block 226 metric. Such schemes may comprise techniques which would permit the block 226 metric to increase temporarily (e.g. for one or more iterations) to avoid local minima or the like. Suitable curve fitting techniques may include, without limitation: linear and/or non-linear regression, numerical optimization (e.g. cost function minimization or maximization via Newton's method, combinatorial methods, first order methods, higher order methods, gradient descent methods), genetic algorithms (e.g. differential evolution) or the like.

After the conclusion of method 220 (block 206 of method 200 (FIG. 2)), method 200 proceeds to block 208 which involves evaluating the partial derivatives of the current model using the current model parameter values 114A determined in block 206. In most cases, modeling instructions 106 will be able to provide analytical functions which describe the partial derivatives of a model with respect to its corresponding model parameters (which may include other models), partial derivatives of its corresponding parameters with respect to market quotes and partial derivatives of its corresponding parameters with respect to other models. In some cases, these partial derivatives may comprise numerically determined functions of the corresponding model parameters. Block 208 may involve substituting the block 206 parameter values into these partial derivative functions of the current model to compute the corresponding derivatives and assembling these derivatives into a suitable array or matrix. This array or matrix of partial derivatives is referred to herein as a model risk matrix 114B. As will be explained in more detail below model risk matrices 114B may be used to evaluate the risk or susceptibility of the conclusions drawn from method 100 to changes in market conditions as represented by changes in market data 104 and/or changes in model parameters.

At the conclusion of block 208, method 200 returns to the block 202 evaluation of the loop-exit condition. If there are more models/parameter sets to calibrate (block 202 NO output), then method 200 proceeds to block 204 and selects the next model/parameter set for calibration. If all of the models/parameter sets specified by modeling instructions 106 (or at least all of the models/parameter sets desired to evaluate a given contract 102) have been calibrated (block 204 YES output), then method 200 ends in block 210. At the conclusion of method 200, model parameter sets 114A include calibrated values of the parameter sets for one or more models and model risk matrices 114B include, for each particular model represented in parameter sets 114A, a corresponding matrix of partial derivatives which may include:
(i) partial derivatives of the particular financial model function with respect to each of the parameters in its corresponding parameter set;
(ii) partial derivatives of the parameters of the particular financial model function with respect to market quotes that form part of market data 104;
(iii) partial derivatives of the particular financial model with respect to other models; and
(iv) partial derivatives of the parameters of the particular financial model function with respect to other models.

Block 112 (FIG. 1) and method 200 (FIG. 2) are now explained in detail for example contract A. As will be explained below, for valuation of example contract A, it is desirable to use the models specified by equations (3), (5) and (7) which respectively have parameter sets $\{q_0\}$, $\{q_1,q_2\}$ and $\{q_3\}$. In a first iteration, the block 202 evaluation will be negative and model equation (3) and corresponding parameter set $\{q_0\}$ are selected in block 204. In block 206, the parameter set $\{q_0\}$ is fit to market data 104. In this example, market data 104 includes a quote r=5% for a 1 year loan. Method 220 (FIG. 3) may be used to perform the block 206 fitting. Assume that an initial guess for the parameter set $\{q_0\}$ in block 222 is $q_0$=2%. In block 224, the equation (3) discount factor model is used to estimate the value (I) of the 1 year loan quoted in the example market data 104. The value (I) for a 1 year loan based on the equation (3) discount factor is given by:

$$I = -1 + (1+r)D(t)|_{t=1} \quad (11)$$

where r is the quoted interest rate for a 1 year loan (i.e. r=5% in the case of the example market data 104). Computing equation (11) for the initial guess of $q_0$=2% gives I=0.0292. In block 226, the model (equation (11)) prediction of the value (I) of the 1 year loan is compared to the known market value (V) of the same loan. In this example case, the known market value of the loan is V=0, since a person should be indifferent to paying 1 unit today and receiving 1.05 units in 1 year's time (assuming that the loan quote is based on an accurate discount factor). In block 228, it is assumed that the block 224 value of I=0.0292 is not sufficiently close to the block 226 market value of V=0, so the block 228 output is negative, the parameter $q_0$ is adjusted in block 234 to begin another iteration. This iteration is repeated until the block 228 evaluation is positive and the current value for $q_0$ is output as the calibrated parameter set $\{q_0\}$ in block 230. In the particular case of the example market data 104 and the example model given by equation (3), the parameter $q_0$ can be determined to be approximately $q_0$=0.0488.

Returning to method 200 (FIG. 2), block 208 involves determining the risk matrix 114B for the equation (3) model. As discussed above, for a particular model, risk matrix 114B may generally include: (i) partial derivatives of the particular financial model function with respect to each of the parameters in its corresponding parameter set; (ii) partial derivatives of the parameters of the particular financial model function with respect to market quotes that form part of market data 104; (iii) partial derivatives of the particular financial model with respect to other models; and (iv) partial derivatives of the parameters of the particular financial model function with respect to other models. The equation (3) discount function model is independent of any other sub-models. Consequently, there are no partial derivatives from categories (iii) and (iv). The category (i) partial derivative of the equation (3) model with respect to its only parameter $q_0$ is given by equation (4). As discussed above, we would also like to know the category (ii) partial derivatives of the model parameter $q_0$ with respect to the market quotes contained in market data 104 (e.g. with respect to the quoted interest rate r in the example market data 104). To determine this derivative, we consider equation (11) and the knowledge that equation (11) is supposed to approach the known market value of V=0. The derivative of equation (11) is given by:

$$dI = D(t)|_{t=1} \partial r + (1+r) \partial [D(t)|_{t=1}] = dV = 0 \qquad (12)$$

Rearranging equation (4) provides:

$$\partial [D(t)|_{t=1}] = -tD(t)|_{t=1} \partial q_0 = -D(t)|_{t=1} \partial q_0 \qquad (4)$$

Substituting this expression into equation (12) and solving for $\partial q_0$ yields:

$$\partial q_0 = (1+r)^{-1} \partial r \text{ or } \frac{\partial q_0}{\partial r} = \frac{1}{(1+r)} \qquad (13)$$

Block 208 then uses equations (4) and (13) to provide the risk matrix 114B, before looping back to block 202.

For example contract A, it is still desirable to calibrate the models represented by equations (5) and (7), so the second iteration of the block 202 evaluation is negative and the equation (5) model (parameter set $\{q_1, q_2\}$) is selected as the next model in block 204. When it comes to fitting the equation (5) model to market data 104 in block 206, it is noted that the market data 104 directly provides both parameters $\{q_1 = \text{US\$98} = \text{current price of Acme stock}, q_2 = 2.9\% = \text{expected dividend rate of Acme stock}\}$. When implementing block 206/method 220 (FIG. 3), these $q_1, q_2$ values can be the initial guess in block 224 (FIG. 3), in which case block 226 comparison between the market data and the model prediction will be exact in the first iteration of method 220 and the parameters $\{q_1 = \text{US\$98}, q_2 = 2.9\%\}$ can be output as model parameter set 114A for the equation (5) model.

Once again, for a particular model, risk matrix 114B may generally include: (i) partial derivatives of the particular financial model function with respect to each of the parameters in its corresponding parameter set; (ii) partial derivatives of the parameters of the particular financial model function with respect to market quotes that form part of market data 104; (iii) partial derivatives of the particular financial model with respect to other models; and (iv) partial derivatives of the parameters of the particular financial model function with respect to other models. The block 208 determination of risk matrix 114B for the equation (5) model includes the category (i) partial derivatives of the equation (5) model with respect to the model parameters $\{q_1, q_2\}$ which are given by equations (6a) and (6b). Since the model parameters $\{q_1, q_2\}$ of the equation (5) model are also the market quotes (i.e. the current Acme stock price and the Acme dividend rate) provided by market data 104, the category (ii) derivatives of the model parameters $\{q_1, q_2\}$ with respect to the market quotes are unity. For the equation (5) model, there is also a category (iii) partial derivative of the equation (5) model with respect to another model (i.e. the equation (3) discount model (D(t)) which is given by equation (6c). The equation (5) model does not include category (iv) partial derivatives since its parameters $\{q_1, q_2\}$ do not depend on any sub-models. These partial derivatives are output in block 208 as derivative matrix 114B corresponding to the equation (5) model before looping back to block 202.

For example contract A, it is still desirable to calibrate the model represented by equation (7), so the next block 202 evaluation is negative and the equation (7) model (parameter set $\{q_3\}$) is selected as the next model in block 204. When it comes to fitting the equation (7) model to market data 104 in block 206, it is noted that the market data 104 once again provides a direct quote of the parameter $\{q_3 = 10\% = \text{Black volatility of 1 year call option on Acme stock}\}$, so that only one iteration of method 220 (FIG. 3) is required to conclude that the parameter $\{q_3 = 10\%\}$ should be output as the calibrated model parameter set 114A for the equation (7) model.

The risk matrix 114B may generally include: (i) partial derivatives of the particular financial model function with respect to each of the parameters in its corresponding parameter set; (ii) partial derivatives of the parameters of the particular financial model function with respect to market quotes that form part of market data 104; (iii) partial derivatives of the particular financial model with respect to other models; and (iv) partial derivatives of the parameters of the particular financial model function with respect to other models. The equation (7) model includes the category (i) partial derivative with respect to its own model parameter $\{q_3\}$ which are given by equation (8). Since the model parameters $\{q_3\}$ of the equation (7) model is also the market quote (i.e. the Black volatility) provided by market data 104, the category (ii) derivative of the model parameter $\{q_3\}$ with respect to the market quote is unity. There are no category (iii) or category (iv) partial derivatives for the equation (7) model. These partial derivatives are output in block 208 as derivative matrix 114B corresponding to the equation (7) model before looping back to block 202.

For example contract A, all of the desired models have been calibrated and so the next block 202 valuation is positive and method 200/block 112 is complete.

A similar procedure may be performed to calibrate the models desired to evaluate example contract B. For example contract B, it is desirable to use a value predicted by Black-Scholes model ($V_B$) for the rate cap contract quoted in market data 104 to have a Black vol $q_4 = 15\%$, the value predicted by the Hull-White model ($V_{HW}$) for the rate cap contract wherein the Hull-White model has the parameters ($\alpha = q_5$ which is specified by market data 104 to have a value $\alpha = q_5 = 5\%$ and $\sigma = q_6$ which is as yet uncalibrated) and the hybrid correlation model (equation (2)) which has a parameter $q_7$ specified by market data 104 to be $q_7 = -30\%$. Method 200 and block 112 may involve:

(i) using the Black vol of the rate cap quote $q_4 = 15\%$ and a discount function underlying the Hull-White model $D_{HW}(t)$ to determine the value of the rate cap contract predicted by Black-Scholes model ($V_B$). We may assume that $D_{HW}(t) = D(t)$ specified by equation (3) as discussed above.

(ii) fitting the value of the rate cap contract predicted by the Hull-White model ($V_{HW}$) to the value of the rate cap contract predicted by the Black-Scholes model ($V_B$) in block 206 by setting $\alpha = q_5 = 5\%$ and varying $\sigma = q_6$ to thereby obtain a value for $\sigma = q_6$;

(iv) determining the various partial derivatives which may include the following:

(a) the partials for all of the model values may be provided by modeling instructions 106 and include:

(i) the derivatives for the Black-Scholes value ($V_B$):

$$dV_B = \frac{\partial V_B}{\partial q_4} dq_4 + \frac{\partial V_B}{\partial D(t)} dD(t) \qquad (14)$$

(ii) the derivatives for the Hull-White value ($V_{HW}$):

$$dV_{HW} = \frac{\partial V_{HW}}{\partial q_5} dq_5 + \frac{\partial V_{HW}}{\partial q_6} dq_6 + \frac{\partial V_{HW}}{\partial D(t)} dD(t) \qquad (15)$$

(iii) the derivatives for the hybrid correlation model provided by equation (2) which are not reproduced here;

(b) the partials for the parameters of the various models which may include:
  (i) the derivatives for the parameters $q_4$, $q_5$ and $q_7$ which are trivial since these parameters represent direct model parameter inputs and do not depend on other models;
  (ii) the derivatives for the calibrated parameter $q_6$ which may involve setting the equation (15) derivative of the Hull-White value ($dV_{HW}$) and the equation (14) derivative of the Black-Scholes value ($dV_B$) equal to one another and solving for $dq_6$ to yield the partial derivatives of the calibrated parameter $q_6$:

$$dq_6 = \left(\frac{\partial V_{HW}}{\partial q_6}\right)^{-1}\left[\frac{\partial V_B}{\partial q_4}dq_4 + \frac{\partial V_B}{\partial D(t)}dD(t) - \frac{\partial V_{HW}}{\partial q_5}dq_5 - \frac{\partial V_{HW}}{\partial D(t)}dD(t)\right] \quad (16)$$

It should be noted here that in general the model parameter sets 114A and model risk matrices 114B determined in method 200 (block 112) as a part of model formation branch 111 are not directly connected to any particular contract 102 to be valuated. The models used in model formation branch 111 and the associated model parameter sets 114A and model risk matrices 114B may be ascertained in the abstract. Advantageously, model parameter sets 114A and model risk matrices 114B determined in a single iteration of model formation branch 111 may be used to valuate a plurality of different contracts 102 via multiple applications of contract valuation branch 120.

We now return to FIG. 1 and contract valuation branch 120. Contract valuation branch 120 commences in block 116 which involves extracting information from legal contract 102 to form internal contract representation 118. In some embodiments, block 116 (or portions thereof) may be performed by a human. In other embodiments, portions of block 116 may be performed by suitable conversion software. The type of information extracted from legal contract 102 may include: a schedule of rights (e.g. to take action or to receive assets) and/or obligations (e.g. to take action or to give away assets); and, for each right/obligation, a description of how the right/obligation is to be determined.

In some embodiments, block 116 may involve an initial step of converting legal contract 102 into a machine-readable or machine-interpretable intermediate form (not shown) which may be referred to as a machine-readable financial contract. This conversion of legal contract 102 into a machine-readable financial contract may be performed by a human. In some embodiments, legal contract 102 may be initially provided as, or may otherwise comprise, a machine-readable financial contract. There are many standards for such machine-readable financial contracts. Some of the more sophisticated participants in the financial markets use their own proprietary form of machine-readable financial contracts. Various trade bodies have also published standardized formats for machine-readable financial contracts. Examples of such as standardized formats include the Financial Products Markup Language (FPML) format and/or the like.

As a part of block 116, legal contract 102 and/or its machine-readable financial contract counterpart is ultimately converted into an internal contract representation 118 suitable for use in the rest of method 100. In some embodiments where legal contract 102 has been converted into or otherwise comprises a machine-readable financial contract, the process of converting the machine-readable financial contract into a corresponding internal contract representation 118 may be automated and performed by computer system 110. That is, in some embodiments, a portion of block 116 corresponding to converting a machine-readable financial contract into corresponding internal contract representation 118 may be performed by computer system 110 which may be programmed to perform suitable data structure translation algorithms. Such data structure translation algorithms may involve a mapping from the machine-readable contract to internal contract representation 118. To ensure the accuracy of this process and the corresponding fidelity of method 100, the intermediate machine-readable contract should correctly and completely describe legal contract 102 and should use variable labels and interpretations that are well defined so that suitable mapping algorithms may be generated.

In other embodiments, block 116 may involve manual conversion of machine-readable financial contracts into corresponding internal contract representations 118 and then inputting the internal contract representation 118 into computer system 110. In still other embodiments, block 116 involves direct manual conversion of legal contract 102 into corresponding internal contract representations 118 (i.e. without first converting legal contract 102 into an intermediate machine-readable form) and then inputting the internal contract representation 118 into computer system 110.

Internal contract representation 118 is itself a machine-interpretable or machine-readable form of a financial contract which is suitable for use by computer system 110 to implement the remainder of contract valuation branch 120 and method 100. As discussed above, computer system 110 may receive internal contract representation 118 as an input (e.g. after a human has converted legal contract 102 into a corresponding internal contract representation 118) or may generate internal contract representation 118 by suitable conversion of an intermediate machine-readable financial contract. Internal contract representation 118 corresponds directly to legal contract 102 and contains information about the rights and obligations underlying legal contract 102. Internal contract representation 118 does not expressly require information about how legal contract 102 should be valuated or modeled. Internal contract representation 118 may comprise a combination of processing elements (e.g. processing functions which may be performed by computer system 110) and observables. Such observables include data that can be observed or otherwise determined sufficiently precisely at a time of interest.

In accordance with one particular embodiment, internal contract representation 118 may comprise a data structure configured to retain information about legal contract 102 in the following manner:
(i) contract: a contract is defined to be a set of one or more flow sets.
(ii) flow set: allow set is defined to comprise one or more of:
  (a) one or more cash flows;
  (b) one or more choose best operations;
  (c) one or more choose worst operations; and/or
  (d) one or more trigger operations.
(iii) cash flow: is a function defined according to cash flow (date of flow, currency, notional amount of the flow, rule, direction), where date of flow represents the date that the cash flow is being paid or received, currency represents the jurisdiction of the currency being paid or received, notional amount of the flow represents the nominal size of the contract, direction of the flow is +1 for receiving cash and −1 for paying cash and rule is defined further below.
(iv) choose best: is a function defined according to choose best(flow set A, flow set B, date/time of choice), where flow set A and flow set B represent two flow sets to choose between and date/time of choice is the date and time at which the choice must be made. A choose best function typically involves choosing the best option of flow set A and flow set B for a particular party to contract 102.

(v) choose worst: is a function defined according to choose worst(flow set A, flow set B, date/time of choice), where flow set A and flow set B represent two flow sets to choose between and date/time of choice is the date and time at which the choice must be made. A choose worst function typically involves choosing the worst option of flow set A and flow set B for a particular party to contract 102. A choose worst operation may be used when the flow sets are defined from the perspective of the counterparty. Logically speaking worst (A, B)=−best (−A, −B), where A and B represent cash flows and a negative sign switches between paying and receiving the cash flow (i.e. the perspective of the cash flow as between the parties to contract 102).

(vi) trigger: is a function defined according to trigger(flow set, condition, date/time of trigger), where flow set represents a flow set that may be triggered at the date/time of trigger if the condition evaluates to be true.

(vii) condition: is a boolean evaluation criteria for a rule which may be true or false.

(viii) rule: any processable function of observable quantities which can be observed or otherwise determined with at least a relative degree of certainty at the time of rule evaluation. A rule may explain how to get from the notional amount of a cash flow to the actual cash flow amount.

Returning to example contract A described above, internal contract representation 118 for example contract A may comprise:
(i) cash flow(4 March 2011, USD, 1, Max(ACME_stock_price[4 March 2011]-100, 0),+1)
where: 4 March 2011 is the exercise date of the option and thus the date of the potential cash flow; USD indicates that the flow is in US dollars; a notional amount of 1 indicates that this particular cashflow does not depend on a multiplication by a notional amount; the rule=Max(ACME_stock_price[4 March 2011]-100, 0) indicates that if the Acme stock price on 4 Mar. 2011 minus the $100 option strike price is less than 0, then the party would not exercise the option and the cash flow would be zero, but if the Acme stock price on 4 Mar. 2011 minus the $100 option strike price is greater than 0, then the party would exercise the option to receive the cash flow of the Acme stock price on 4 Mar. 2011 minus the $100 option strike price; and the direction +1 indicates that the party is receiving the cash flow.

Another suitable internal contract representation 118 for example contract A may comprise:
(i) choose best(cash flow A, cash flow B, 4 March 2011);
(ii) cash flow A=cashflow(4 March 2011, USD, 1, ACME_stock_price[4 March 2011]-100, +1); and
(iii) cash flow B=0.

It will be appreciated on the basis of this example that suitable internal contract representations 118 for a particular legal contract 102 are not unique.

Figure 4:
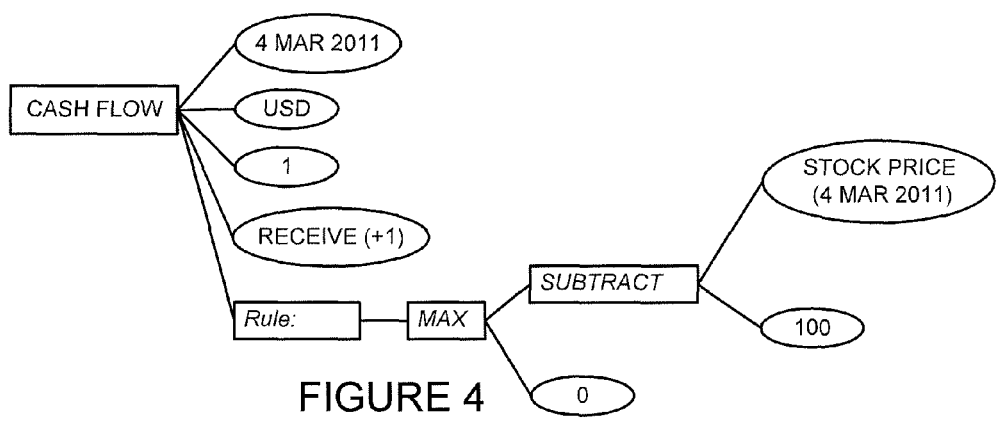
FIG. 4 is a schematic tree format representation of a suitable internal contract representation for an example contract and FIGS. 4A and 4B schematically depict the FIG. 4 representation after additional internal processing.

FIG. 4 shows a schematic "tree format" representation of the first of the above-described internal contract representations 118 for example contract A wherein the blocks of the FIG. 4 represent processing functions (shown as rectangles) or data and/or observable quantities (shown as ellipses). The FIG. 4 schematic "tree format" views are useful for describing the rest of the processing associated with method 100.

The processing functions (shown as rectangles) which are used in the rules of internal contract representations 118 may include a wide variety of processing functions. By way of non-limiting example, such processing functions could include: mathematical processes (e.g. PRODUCT, SUM, SUBTRACT, RATIO, POWER, SQUARE ROOT, LOGARITHM, ABSOLUTE VALUE, NEGATION, GET INTEGER PART, GET FLOATING POINT (e.g treat value as floating point number), FLOOR OF VALUE, ERF (Gaussian error function), ERFC (complementary Gaussian error function), functions which compare information (e.g. MIN, MAX, LESS THAN, LESS THAN OR EQUAL TO), boolean logical operations (e.g. NOT, AND, OR, LOGICAL INEQUALITY), array manipulation functions (e.g. ARRAY (makes an array of multiple data elements), FIRST (picks the first element of an array), INDEX (picks a specified element of an array), LENGTH (returns the number of elements in an array), SORT (sorts the array), SORT INDICES (gets the position in the array of sorted elements), SUB-ARRAY (forms a sub-array out of select elements of an array), SEARCH (looks in array) and/or the like.

Returning to example contract B described above, an internal contract representation 118 for example contract B may comprise:
(i) choose worst(flow set A, flow set B, 5 Sep. 2010);
(ii) flow set A=0; and
(iii) flow set B={cash flow(15 March 2011, USD, $10 million, Rule_1, −1);
cash flow(15 March 2011, USD, $10 million, Rule_2, +1);
cash flow(15 March 2012; USD; $10 million, Rule_3, −1);
cash flow(15 March 2012, USD, $10 million, Rule_4, +1)}
(iv) Rule_1: USD_LIBOR_12_months[11 March 2010];

$$\text{Rule\_2: } \text{Max}\left(0, \text{Min}\left(10\%, \frac{\text{Acme\_stock\_price[10 March 2011]}}{\text{Acme\_stock\_price[10 March 2010]}} - 1\right)\right);$$

Rule_3: USD_LIBOR_12_months [11 March 2011]; and $$\text{Rule\_4: } \text{Max}\left(0, \text{Min}\left(10\%, \frac{\text{Acme\_stock\_price[12 March 2012]}}{\text{Acme\_stock\_price[10 March 2011]}} - 1\right)\right).$$

Figure 5:
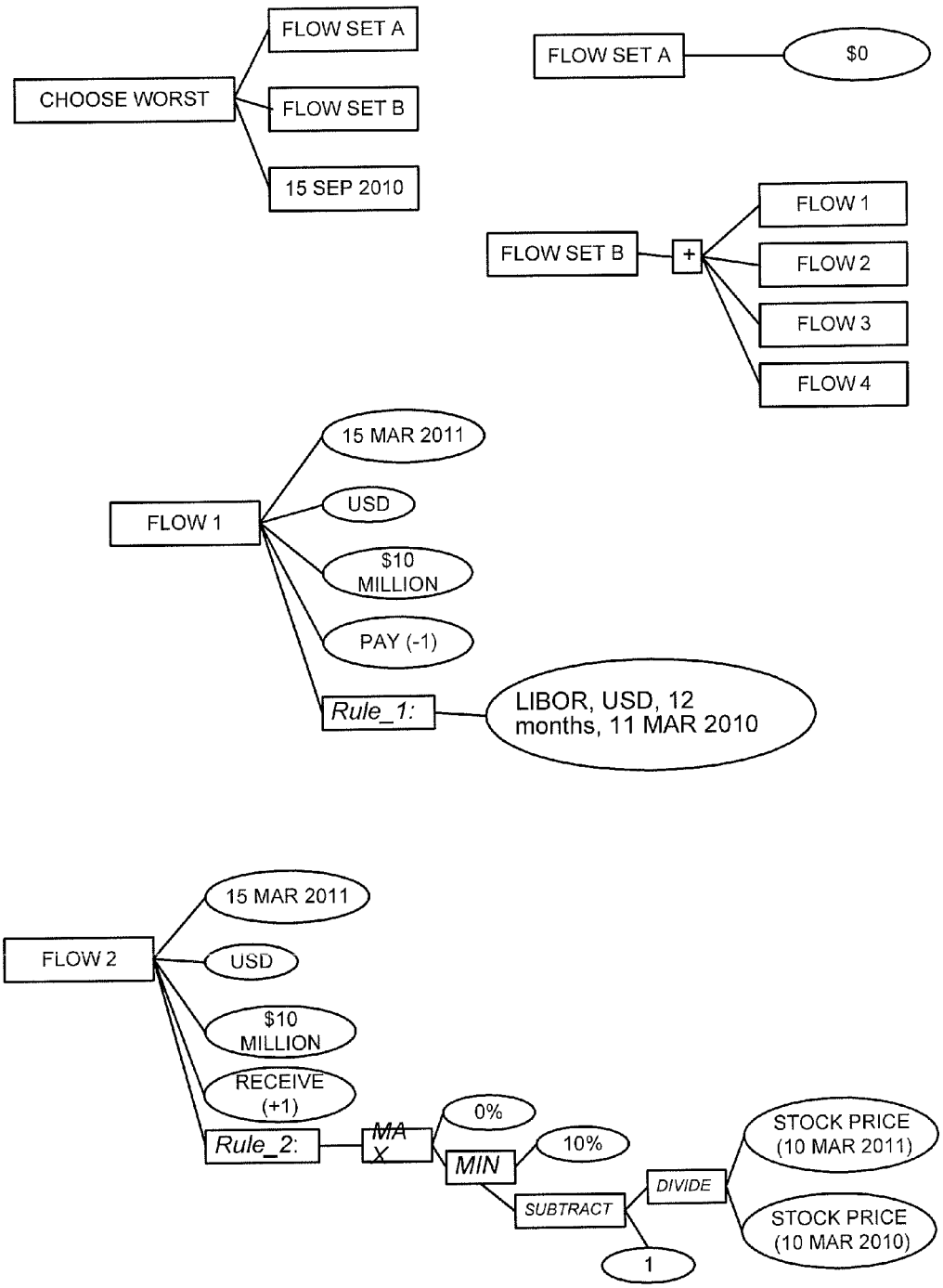
FIG. 5 is a schematic tree format representation of a suitable internal contract representation for another example contract and FIGS. 5A, 5B and 5C schematically depict the FIG. 5 representation after additional internal processing.
Figure 5:
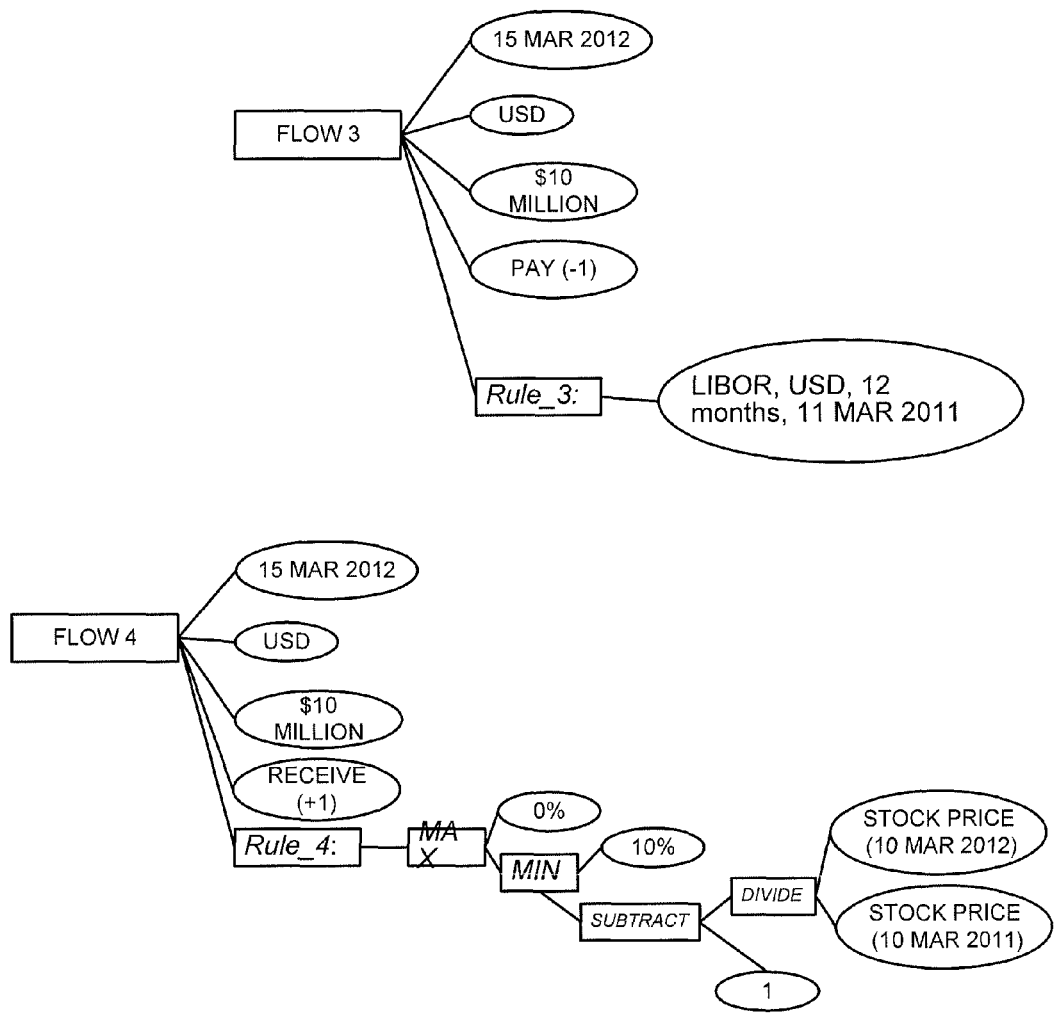

FIG. 5 shows a schematic "tree format" representation of the above-described internal contract representation 118 for example contract B wherein the blocks of the FIG. 5 represent processing functions (shown in rectangles) or data and/or observable quantities (shown as ellipses). The FIG. 5 schematic "tree format" views are useful for describing the rest of the processing associated with method 100.

Returning to FIG. 1, once internal contract representations 118 have been input into (and/or generated by) computer system 110, contract valuation branch 120 of method 100 proceeds to block 122 which involves using internal contract representations 118 together with valuation details 108 to generate valuation functions 124A and corresponding valuation function risk 124B. Valuation details 108 represent an optional input to method 100 and may comprise one or more particular details related to a valuation to be performed in valuation branch 120. By way of non-limiting example, valuation details 108 may include: the date at which contract 102 is to be evaluated and whether that date's cash flows are to be included in the simulation (e.g. it may be desirable to valuate contract 102 today if contract 102 can still be acquired today, but if the valuation is being performed after the close of business on a particular calendar date, then it may be desirable to valuate the contract on the next business day); specification of whether the valuation date's observable are known or to be determined; the market data particulars of the modeling approach for the block 126 stochastic valuation/simulation process described in more detail below (e.g. which of the exogenous variables are to be treated as stochastic and non-stochastic for the block 126 simulation/valuation, a number of simulation iterations to be performed in the block 126 simulation/valuation, the manner in which a random number is generated in the block 126 simulation/valuation and/or the like); the currency in which contract 102 is being evaluated; and/or the like. Valuation functions 124 (i.e. the output of block 122) comprise a representation of legal contract 102 that is suitable for valuation/simulation in block 126 as discussed in more detail below.

The block 122 process of generating valuation functions 124A and valuation risk functions 124B may be achieved via a series of processing transformations applied to internal contract representation 118. The particular choice of transformations for any given execution of block 122 will depend on user selection of a modeling approach to be used in the block 126 stochastic valuation/simulation process (see FIG. 1). For example, as part of a particular modeling approach, a user may choose particular exogenous observables to be treated as stochastic and particular exogenous observables to be treated as non-stochastic. The modeling approach may also specify the particular models to use for which of the stochastic variables. The particulars of the modeling approach may form part of valuation details 108 and may be user input or may be automatically configured (e.g. based on details of contract 102 and/or its internal representation which may trigger a corresponding modeling approach).

The particulars of the modeling approach may be input by a user and may be provided to computer system 110 as part of valuation details 108. In the case of example contract A, we will assume that a user has selected (and that valuation details 108 specify) that contract A should be valued as follows:
(i) the valuation date should be 4 Mar. 2010 (assuming that 4 Mar. 2010 is today);
(ii) the valuation currency should be in US dollars (USD);
(iii) the forward ACME stock price F(t) should be modeled using a Black-Scholes stochastic process wherein:
  (a) the volatility σ of the Black-Scholes stochastic process will be the Black volatility quote (parameter $q_3$) obtained from model formation branch 111 and will be a non-stochastic variable;
  (b) the mean p of the Black-Scholes stochastic process will be the forward price F(t) of ACME stock predicted by the equation (5) model treated non-stochastically;
  (c) the parameters $q_1$, $q_2$ of the equation (5) model for forward price F(t) of ACME stock will be non-stochastic variables obtained by model characterization during model formation branch 111;
  (d) the underlying discount function of the equation (5) forward price model will be $D_F(t)=D(t)$, where D(t) is the equation (3) discount factor model treated non-stochastically;
  (e) the parameter $q_0$ of the equation (3) discount model for D(t) will be a non-stochastic variable obtained by model characterization during model formation branch 111;
(iv) 1000 sample paths will be used for the block 126 simulation/valuation. Sample paths are explained in more detail below; and
(v) the randomness will be generated using a Sobol quasi-random number generator (QRNG).

In the case of example contract B, we will assume that a user has selected (and that valuation details 108 specify) that contract B should be valuated in accordance with the following modeling approach:
(i) the valuation date should be 10 Mar. 2010 (i.e. the start date of the first roll);
(ii) the valuation currency should be in US dollars (USD);
(iii) the forward ACME stock price F(t) should be modeled using a Black-Scholes stochastic process wherein:
  (a) the volatility σ of the Black-Scholes stochastic process will be the Black volatility quote (parameter $q_3$) obtained from model formation branch 111 and will be a non-stochastic variable;
  (b) the mean μ of the Black-Scholes stochastic process will be the forward price F(t) of ACME stock predicted by the equation (5) model treated non-stochastically;
  (c) the parameters $q_1$, $q_2$ of the equation (5) model for forward price F(t) of ACME stock will be non-stochastic variables obtained by model characterization during model formation branch 111;
  (d) the underlying discount function of the equation (5) forward price model will be $D_F(t)=D(t)$, where D(t) is the equation (3) discount factor model treated non-stochastically;
  (e) the parameter $q_0$ of the equation (3) discount model for D(t) will be a non-stochastic variable obtained by model characterization during model formation branch 111;
(iv) the forward discount factor from t=a to t=b (where b>a) as seen at t=a is given by $D^*(a,b)|x_a$ where $x_a$ is a set of state variables at the time t=a and should be modeled using a Hull-White stochastic process. We will assume a single factor Hull-White model (i.e. the set of state variables $x_a$ is a single random variable with known distribution) and wherein:
  (a) the underlying discount function of the Hull-White model will be $D_{HW}(t)=D(t)$, where D(t) is the equation (3) discount factor model treated non-stochastically;
  (b) the mean μ of the Hull-White stochastic process will be predicted by the underlying Hull-White discount function $D_{HW}(t)$ to be $D_{HW}(b)/D_{HW}(a)=D(b)/D(a)$;
  (c) the parameters $\alpha=q_5$ and $\sigma=q_6$ of the Hull-White stochastic process will be non-stochastic variables obtained by model characterization during model formation branch 111;
  (d) the parameter $q_0$ of the equation (3) discount model for D(t) will be a non-stochastic variable obtained by model characterization during model formation branch 111;
(v) if Y is understood to be the stochastic forward discount rate and X is understood to be the stochastic forward stock price, then the equation (2) hybrid correlation corr(X,Y) between these random processes should be equal to parameter $q_7$ which should be treated as a non-stochastic variable. Maintaining this correlation can skew the results for the average value of the Acme stock predicted by the stochastic processes X and Y. We expect the average value of the Acme stock to be F(t)D(t) where F(t) is the forward price of ACME stock predicted by the equation (5) model treated non-stochastically and $D(t)=D_{HW}(t)$ is the underlying discount function of the Hull-White model (i.e. equation (3) treated non-stochastically). To ensure that average value of the Acme stock will be given by F(t)D(t), we replace the stochastic forward stock price variable X with a scaled stochastic forward stock price variable $\overline{X}$ given by $$\overline{X} = X\left[\frac{F(t)D(t)}{E[X \cdot Y]}\right],$$

so that average value of the Acme stock predicted by the stochastic processes $\overline{X}$ and Y will be F(t)D(t) and corr($\overline{X}$, Y) will be equal to parameter $q_7$;

(vi) 1000 sample paths will be used for the block 126 simulation/valuation. Sample paths are explained in more detail below; and (vii) the randomness will be generated using a "Mersenne Twister" pseudo-random number generator (PRNG).

Figure 6:
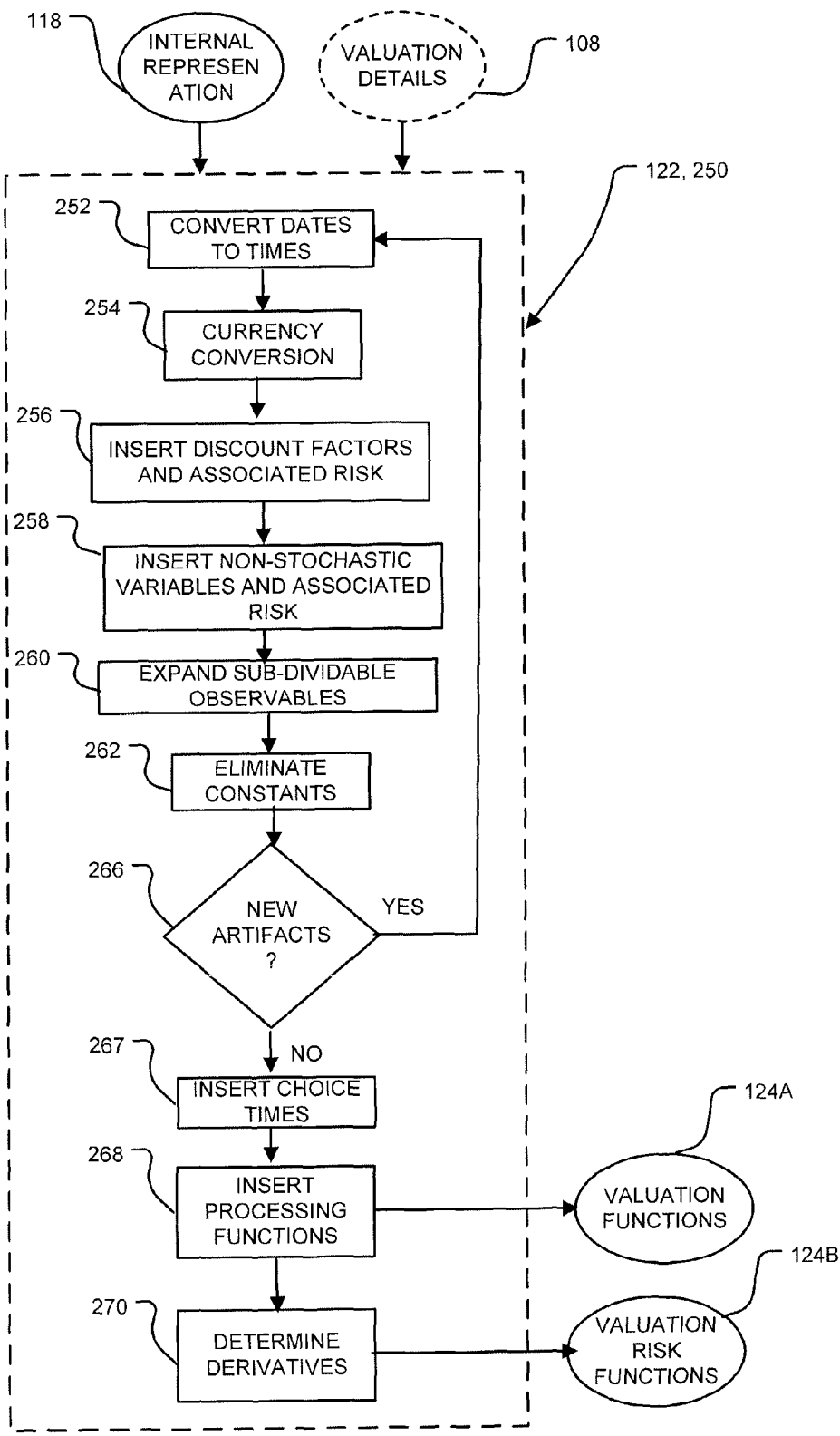
FIG. 6 is a block diagram depiction of a method for generating valuation functions suitable for use with the FIG. 1 valuation method according to a particular embodiment.

FIG. 6 schematically depicts a method 250 suitable for implementing the block 122 procedure of generating valuation functions according to a particular embodiment. Method 250 commences in block 252 which involves converting contractual dates (e.g. dates contained in internal contract representations 118) into times that are compatible with the models calibrated in model formation branch 111 and, in particular, the calibrated models specified by valuation details 108. The block 252 contract date/model time transformation may involve, for example, subtracting a contract valuation date (specified by valuation details 108) from a future date contained in internal contract representation 118. By default, the contract valuation date may be set to the date that contract valuation branch 120 is implemented, but in general, the contract valuation date may be any date on or after the date that contract valuation branch 120 is implemented. Block 252 may also involve excising (from internal contract representation 118) any portion of the contract that can no longer form part of the valuation. Portions of a contract that no longer form part of the valuation may include, for example, portions of the contract that have occurred before the valuation date, portions of the contract that cannot occur because of clauses that cannot be triggered and/or the like.

The internal contract representation 118 for example contract A is shown in FIG. 4. Assuming that the valuation date of example contract A is 4 Mar. 2010, then block 252 may involve converting the 4 Mar. 2011 cash flow date and 4 Mar. 2011 stock price date to model times of 1 year. This contract date to model time transformation for example contract A is shown schematically in FIG. 4A. The internal contract representation 118 for example contract B is shown in FIG. 5. Assuming that the valuation date of example contract B is 10 Mar. 2010, then the contract dates of the example contract B internal representation 118 may be transformed into model times. This contract date to model time transformation for example contract B is shown schematically in FIG. 5A. In the choose worst function, the 15 Sep. 2010 date is converted into a model time (in units of years) according to the expression:

$$\frac{\# \text{ days}(15 \text{ Sep } 2010 - 10 \text{ Mar } 2010)}{365} = \frac{189}{365} = 0.5178.$$

Similarly, the 15 Mar. 2011 and 11 Mar. 2010 dates in flow_1 are respectively calculated to be $$\frac{\# \text{ days}(15 \text{ Mar } 2011 - 10 \text{ Mar } 2010)}{365} = \frac{370}{365} = 1.0137$$

and $$\frac{\# \text{ days}(11 \text{ Mar } 2010 - 10 \text{ Mar } 2010)}{365} = \frac{1}{365} = 0.0027.$$

Figure 5A:
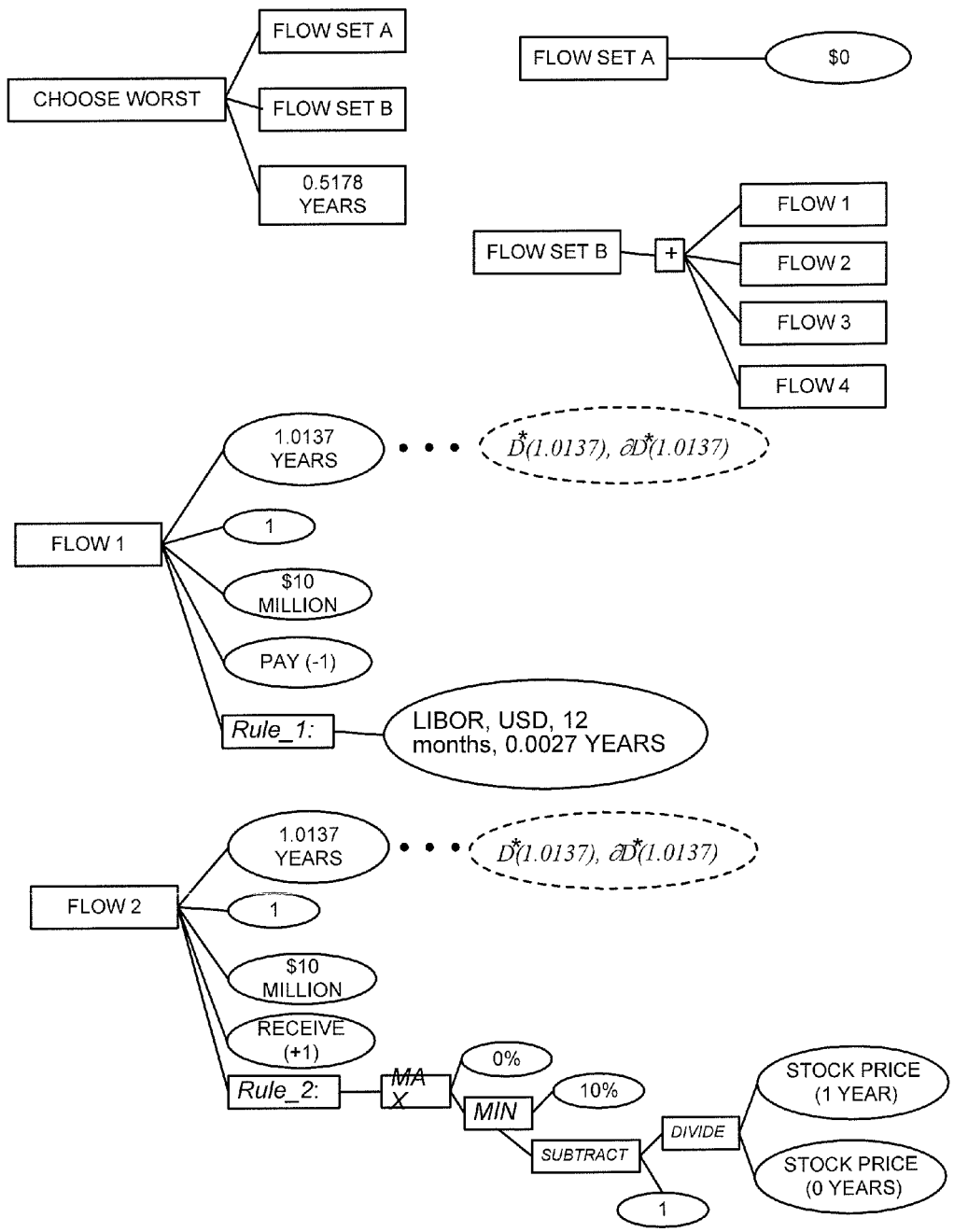
Figure 5A:
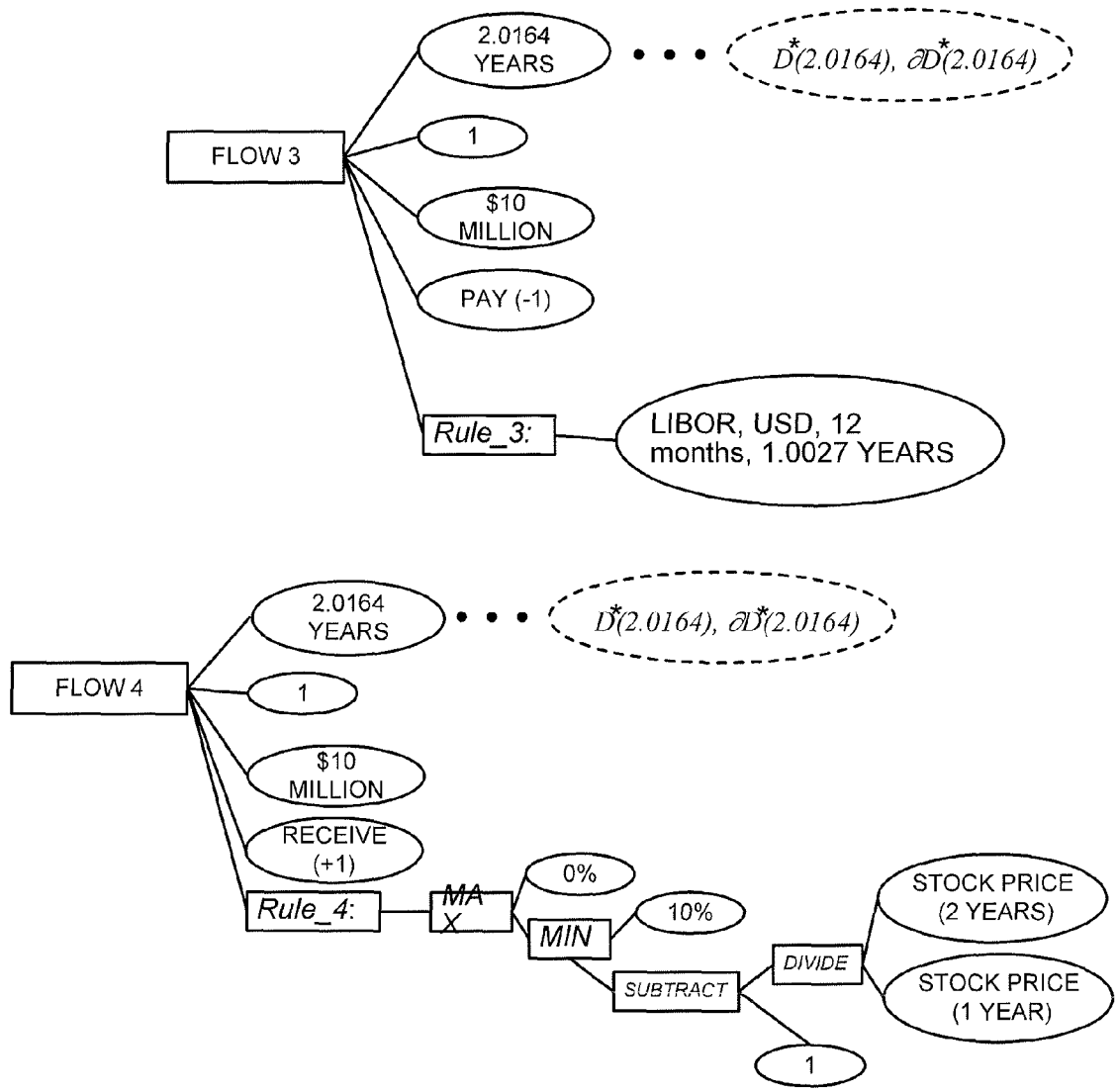

Similar processing calculations may be performed for the dates in flow_2, flow_3 and flow_4 and are shown in FIG. 5A.

Figure 4A:
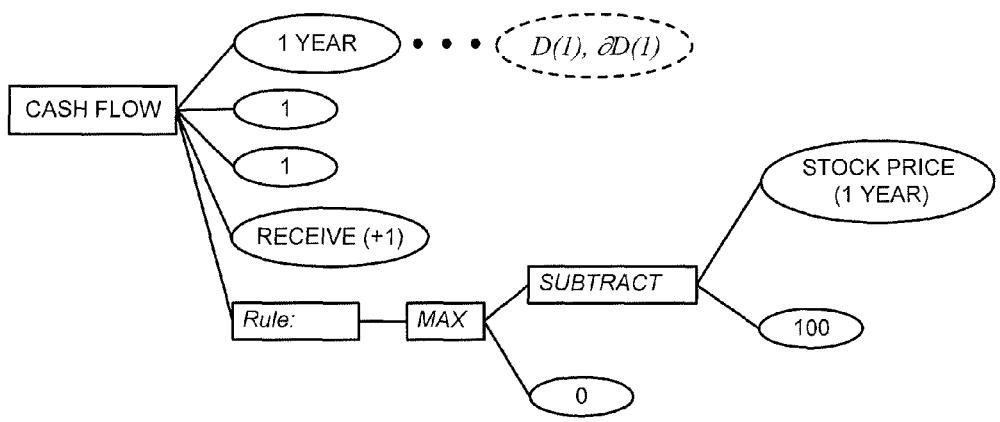

After the date/time conversion of block 252, method 250 proceeds to block 254 which involves taking the block 252 result and converting all of the payments and receipts into a single currency by inserting currency exchange (FX) conversion rates, so that the contract representation is all represented in terms of a single currency. Typically, this currency would be selected by a user as a currency of valuation and may be specified in valuation details 108. For example, a user may want to valuate (in euros) a contract 102 that specifies payment of x in US dollars and receipt of y in Canadian dollars, both on 20 Oct. 2010. This contract would be converted in block 254 to pay USD x times the USD-EUR exchange rate and receive CAD y times the CAD-EUR exchange rate, both on 20 Oct. 2010. If the contract in question were being modeled prior to 20 Oct. 2010 date, then the two FX rates at 20 Oct. 2010 are not directly observable from market data 104 on the valuation date. In such cases, these two FX rates could be specified (as part of the modeling approach contained in valuation details 108) to be stochastic variables which would be used in the block 426 valuation or to be non-stochastic values which may be obtained from model formation branch 111. In the case of example contract A and example contract B, we have assumed that valuation details 108 specify that the valuation is to be performed in USD. Since all of the payments and receipts for both of these example contracts are already in USD, the USD field in the cash flow of example contract A (FIG. 4) and the USD fields in the flow_1, flow_2, flow_3 and flow_4 of example contract B (FIG. 5) may be converted to unity (1), since the exchange rate between USD and USD is unity. This is conversion is shown in FIG. 4A (for the cash flow of example contract A) and in FIG. 5A (for the cash flows (flow_1, flow_2, flow_3 and flow_4) of example contract B).

Method 250 then proceeds to block 256 which receives the output of block 254 and inserts discount factors in the place of times for cash flows taking place after the valuation date. The modeling approach specified in valuation details 108 may specify the particular discount functions to use to obtain the discount factors and whether these discount factors should stochastic or non-stochastic. Example contract A includes a cash flow at t=1 year which should be discounted to the valuation date t=0. Valuation details 108 for example contract A specify that the discount factor D(t) should be treated as a non-stochastic variable having a value determined by equation (3) and its corresponding parameter set 114A (i.e. $\{q_0\}$). Accordingly, for the example contract A cash flow, block 256 involves inserting the following information into the contract representation in the place of the time t=1 year: (i) a discount factor model D(t=1)=D(1) evaluated using model parameter set 114A corresponding to the equation (3) model (i.e. $\{q_0\}$); and (ii) a pointer, placeholder, instructions or the like (denoted ∂D(t=1)=∂D(1)) which refer to model risk matrix 114B associated with the discount factor model D(t) evaluated at t=1 and prescribe how this risk may be evaluated for the time t=1 using the model risk matrix 114B. In the notation of this description, the expression ∂D(1) denotes instructions or the like which refer to and prescribe how to determine the model risk (or partial derivative) matrix 114B of the model function D(t) evaluated at t=1. The block 256 insertion of the discount factor D(1) and corresponding risk information ∂D(1) for example Contract A is shown in dashed lines in FIG. 4A.

Example contract B includes flow_1 and flow_2 which take place at t=1.0137 and flow_3 and flow_4 which take place at t=2.0164 and these flows should be discounted to the valuation date (t=0 in this case). However unlike the future cash flows for example contract A, the modeling approach for example contract B specifies that the forward discount rate D*(a,b) for these future flows is to be treated as a stochastic variable. We use the notation D* (i.e. with the asterisk) to indicate that the discount rate should be treated as a stochastic variable. Since the valuation date of the example B contract is time t=0 and the underlying discount function provides D(a, b)=D(a)/D(b), we may simplify the notation for the stochastic variable discount rate at some future time t to be D*(t) as seen at the t=0 valuation date. Accordingly, for the example contract B cash flows flow_1 and flow_2, block 256 involves inserting the following information into the contract representation in the place of the time t=1.0137 years: (i) a stochastic variable discount factor D*(t=1.0137)=D*(1.0137); and (ii) instructions (denoted ∂D*(t=1.0137)=∂D*(1.0137)) which refer to model risk matrix 114B associated with the Hull-White forward discount rate model evaluated at t=1.0137 and prescribe how this risk may be evaluated for the time t=1.0137 using the model risk matrix 114B. For the example contract B cash flows flow_3 and flow_4, block 256 involves inserting the following information into the contract representation in the place of the time t=2.0164 year: (i) a stochastic variable discount factor D*(2.0164); and (ii) instructions (denoted ∂D*(2.0164)) which refer to model risk matrix 114B associated with the Hull-White forward discount rate model evaluated at t=2.0164 and prescribe how this risk may be evaluated for the time t=2.0164 using the model risk matrix 114B. The block 256 insertion of these discount factors and corresponding risk information for example Contract B is shown in dashed lines in FIG. 5A.

Method 250 then proceeds to block 258 which involves taking the contract representation output from block 256 replacing any other non-stochastic variables contained in the contract representation with the values and associated risks for those non-stochastic variables. The values and associated risk inserted into the contract representations in block 258 may include information contained in parameter sets 114A and corresponding risk matrices 114B and/or market observables. By way of non-limiting example, other non-stochastic variables may include: direct model inputs such as foreign exchange rates, a particular rate which is specified to be treated as non-stochastic and/or the like. Example contracts A and B do not have any non-stochastic variables that may be inserted in block 258.

Method 250 then proceeds to block 260 which involves taking the result of block 258 and expanding sub-dividable observables into their component observables in accordance with the modeling approach provided by valuation details 108. For the purpose of this description, a sub-dividable observable is an observable which may be modeled, determined, predicted or approximated by one or more component observables wherein at least one of the component observables is itself (or is a function of a parameter that is) specified to be treated stochastically for the purpose of a particular valuation. One non-limiting example of a sub-dividable observable is the Dow Jones Exchange Rate, which includes the price of a number of stocks each of which may itself be treated as a stochastic variable.

Other examples of sub-dividable observables include the USD_LIBOR_12 months[11 March 2010] and USD_LIBOR_12 months[11 March 2011] rules from flow_1 and flow_3 of example contract B. These LIBOR rates may be expressed in terms of a component observable (the discount factor D*(a,b)) which itself is specified to be treated as a stochastic variable in accordance with modeling approach for the example contract B. For example, assume that the LIBOR fixing date is t=f and that the start date and end dates of a LIBOR interest accrual period δ are respectively t=s and t=x, where δ=x−s. Assume also that the LIBOR rate at the fixing date t=f is represented as $L_f$. A loan contract based on this LIBOR rate $L_f$ may then be described as paying 1 unit at a time t=s and receiving $(1+\delta L_f)$ units in return at the time t=x. The value of such a contract as seen at the LIBOR fixing date t=f may be expressed as:

$$1D^*(f,s)+(1+\delta L_f)D^*(f,x)=0 \tag{17a}$$

This expression may be solved for $L_f$ as a function of D*(f,x) and D*(f,s) to be:

$$L_f = \frac{\left(\frac{D^*(f,s)}{D^*(f,x)}-1\right)}{\delta} \tag{17b}$$

Accordingly, for example contract B, block 260 may involve using equation (17b) together with the information from flow_1 and flow_3 to replace USD_LIBOR_12 months [11 March 2010] and USD_LIBOR_12 months[11 March 2011] in flow_1 and flow_3 with functions (based on equation (17b)) of the stochastic discount factor D*(a,b). This block 260 process is indicated in schematic mathematical form in FIG. 5B. For the first roll of example contract B, f=11March2010=1/365=0.0027; s=15March2010=5/365=0.0137; x=15March2011=370/365=1.0137; and δ=15March2011−15March2010=1; and for the second roll of example contract B, f=11March2011=366/365=1.0027; s=15March2011=370/365=1.0137; x=15March2012=(370+366)/365=2.0164; and δ=15March2012-15March2011=1.0027. Note that 2012 is a leap year with 366 days. For brevity, the notation $L_f$(f=<<date>>,s,x) is used in this description to refer to the equation (17b) substitution.

Method 250 then proceeds to block 262 which involves taking the result of block 260 and collapsing the corresponding representation of the contract by eliminating or combining known constants. For example, considering the representation of the example contract A shown in FIG. 4A, it can be seen that there are a number of constants, including: the currency FX rate of 1 (since the flow and valuation are both to be in USD); the notional value of the particular contract which is 1; and the +1 indicating that the flow is to be received. These known constants can be combined (in this case via multiplication, but more generally by one or more mathematical or processable functions that may be specified (e.g. by a rule) in the contract representation. Once the known values are combined, the corresponding contract representation may be collapsed.

Figure 4B:
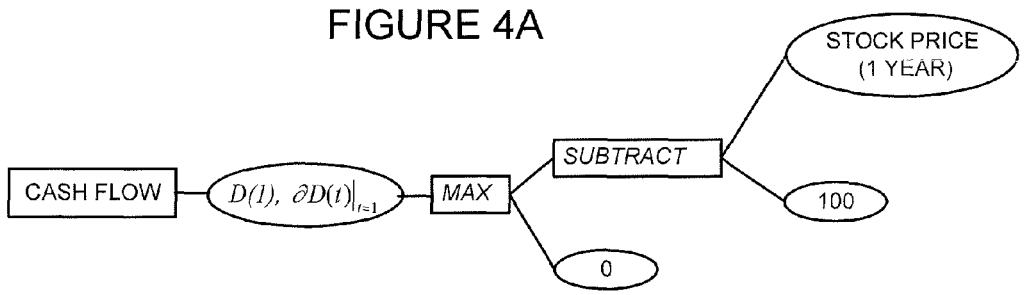

In the particular circumstances of example contract A, the known constants (i.e the currency FX rate of 1, the notional value of 1 and the +1 indicating that the flow is to be received) can be multiplied together and thereby reduced to unity. The resultant contract representation for example contract A after the block 262 operation of eliminating constants is shown in FIG. 4B. It can be seen that the known constants have been eliminated from the FIG. 4B representation. In the relatively simple case of example contract A, the representation of the value of the contract may be written in a short-hand form as:

$$\text{cash flow}=D(1)^*\text{Max}(\text{Acme\_stock\_price}(1)-100,0) \tag{18}$$

where Acme_stock_price(1) represents the Acme stock price at a time 1 year from the valuation date. It should be noted here that in addition to a representation of the value of the contract, the output of block 262 also comprises a risk component. This is shown (for example contract A) in the schematic FIG. 4B representation which includes the discount factor model (D(1)) and its associated risk information (δD (1)).

Figure 5B:
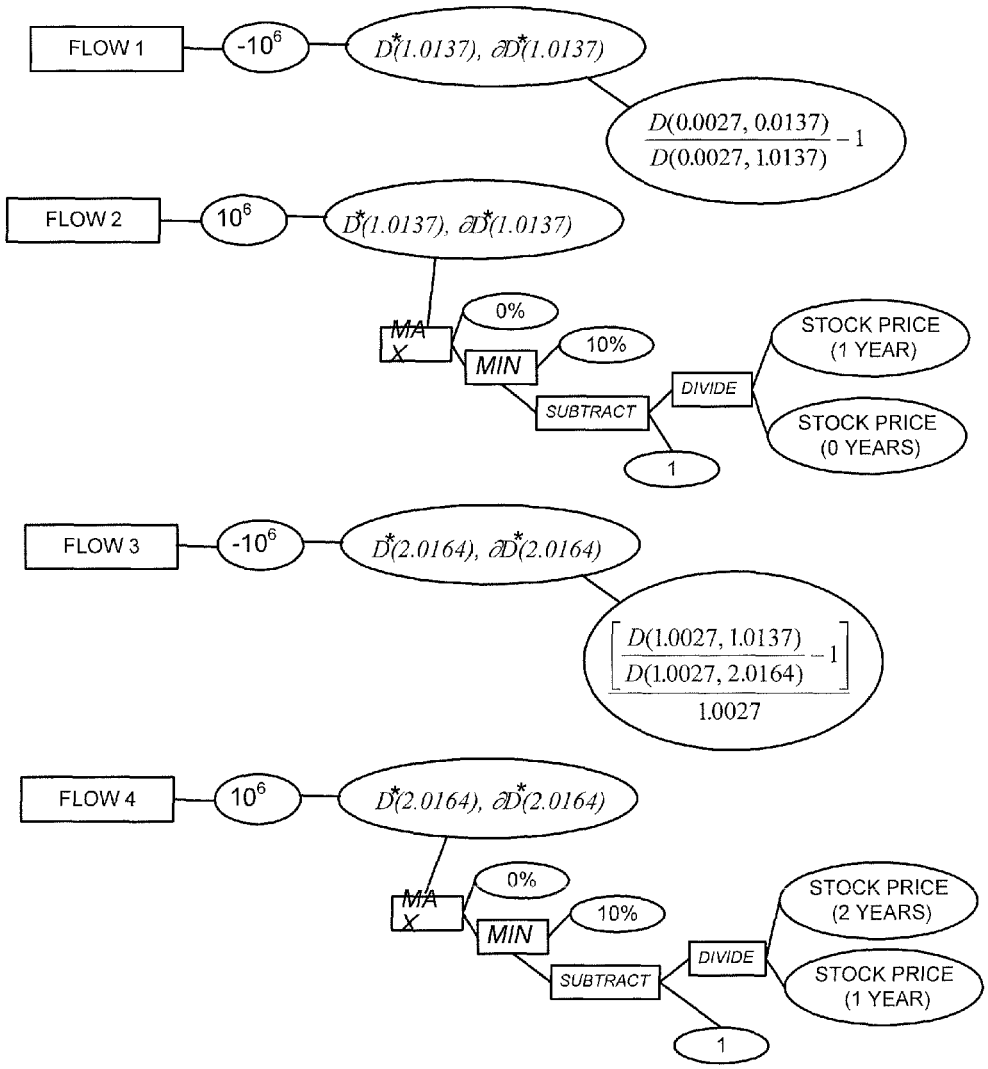

For the particular circumstances of example contract B, the known constants which can be eliminated in block 262 include the currency FX rate of 1, the notional value of $10^6$ and the flow direction (+1 for flow_2 and flow_4 and −1 for flow_1 and flow_3). Elimination of these known constants for flow_1, flow_2, flow_3 and flow_4 is shown in FIG. 5B. In the case of example contract B, the known constants reduce to $-10^6$ in the case of flow_1 and flow_3 and to $10^6$ in the case of flow_2 and flow_4. A shorthand form for these flows can then be written:

$$\text{flow\_1}=-10^6D(1.0137)L_f(1.0027, s=15\text{Mar}2010=0.0137,x=15\text{Mar}2011=1.0137) \tag{19a}$$

$$\text{flow\_2}=10^6D(1.0137)\text{MAX}[0,\text{MIN}[10\%,\text{total\_return}(1,0)]] \tag{19b}$$

$$\text{flow\_3}=-10^6D(2.0164)L_f(1.0027, s=15\text{Mar}2011=1.0137,x=15\text{Mar}2012=2.0164) \tag{19c}$$

$$\text{flow\_4}=10^6D(2.0164)\text{MAX}[0,\text{MIN}[10\%,\text{total\_return}(2,1)]] \tag{19d}$$

where $$\text{total\_return}(x,y)=\text{stock\_price}(\text{time}=x)/\text{stock\_price}(\text{time}=y)-1 \tag{19e}$$

and the value of example contract B is given by:

$$\text{choose\_worst}[0, \text{flow\_1} + \text{flow\_2} + \text{flow\_3} + \text{flow\_4}, 0.5178] \quad (19f)$$

As was the case with example contract A, it should be noted here that in addition to a representation of the value of the contract, the output of block 262 also comprises a risk component. This is shown (for example contract B) in the FIG. 5B representation of flow_1, flow_2, flow_3 and flow_4 which includes the discount factor models (D(1.0137), D(2.0164)) and the pointer to their associated risk matrices (∂D(1.0137), ∂D(2.0164)).

Method 250 then proceeds to block 266 which involves an assessment of whether the processing in blocks 252 through 262 has introduced any new artefacts which may be further processed by another iteration of blocks 252 through 262. By way of non-limiting example, artefacts may be produced when sub-dividable observables are expanded into their constituent observables in block 260. If the block 266 evaluation is positive, then method 250 loops back to block 252 to perform another iteration of blocks 252 through 262. If, on the other hand, the block 266 evaluation is negative, then method 250 proceeds to block 267. It will be appreciated that in some embodiments it may be desirable to iteratively perform some of the operations of block 252 through 262. By way of non-limiting example, it may be desirable to expand the LIBOR model in block 260 in a first iteration and then to insert the corresponding discount functions as non-stochastic in a next iteration of block 256 or then to insert the corresponding discount functions as stochastic in the next iteration of block 258. In such cases, the block 266 evaluation may be positive after the first iteration in which the LIBOR model is expanded. In the case of the above-discussed examples, however, all desired operations may be performed in a single iteration of blocks 252 through 262 and there are no remaining artefacts. Consequently, the block 266 evaluation is negative and method 250 proceeds to block 267.

Block 267 involves assessing whether there are any choice functions (i.e. choose_best or choose_worst functions) in the contract representation (i.e. the representation of the contract output from the last iteration of block 262). If there are any such choice functions, then block 267 involves adjusting the observation times of any stochastic forward looking rate processes located downstream of the choice function in the contract representation. The block 267 procedure is performed so that all of the stochastic forward looking rate processes associated with the choice can be "observed" at the same time, thereby allowing the choice to be made accurately. Typically, discount factors are modeled using stochastic forward looking rate processes. One specific example of a type of stochastic forward looking rate process is the Hull-White process used to model the discount factors in example contract B.

In general, the stochastic discount function provided by the Hull-White process may be specified as D*(a,b) and models the expected value and uncertainty of the discount factor between time t=a and t=b (where b≥a) as observed at time t=a. For the purpose of example contract B, the valuation time of interest is t=0 and so we have been able to set the observation time t=a of the discount function D*(a,b) to be t=a=0. Consequently, we have been referring to the stochastic discount function for example contract B as a function of a single variable D*(t) where it is implicit that $D^*(t) = D^*(a,t)|_{a=0}$—i.e. where the a=0 observation time is implied.

As discussed above, block 267 involves adjusting the observation times of any stochastic forward looking rate processes located downstream of a choice function in the contract representation. In the case of example contract B, the entire contract is a choose_worst function (see FIGS. 5, 5A). More particularly, an internal representation of the example B contract is choose_worst[0,flow_1+flow_2+flow_3+flow_4,0.5178] where flow_1, flow_2, flow_3 and flow_4 are given by equations (19a)-(19e). Accordingly, the observation times of all of the stochastic forward looking rate processes in the example contract B representation should be shifted in block 267.

In example contract B, the stochastic forward looking rate processes include the Hull-White stochastic discount functions D*(t). Block 267 involves the following procedure for time shifting the example contract B discount functions:

(i) the observation times of discount functions D*(a,b) are shifted to provide D*(x,b) where x is the latest of:

(a) the contract valuation time (t=0); and (b) any choice time $t_c$ if $t_c < a$.

For other contracts involving other stochastic forward looking rate processes downstream of choice functions (i.e. choose_best or choose_worst functions), the shifting of the observation time may follow a similar procedure wherein the observation time is shifted to a later of the valuation time or the choice time $t_c$ if the choice time $t_c$ occurs before the original observation time. This observation time shift is shown schematically in FIG. 5C. Comparing FIGS. 5C and 5B, it can be seen that the only parts of the contract impacted are flow_1 and flow_3. In the stochastic forward looking rate processes of flow_1, the LIBOR fixing/observation date (t=0.0027) is before the choice time ($t_c$=0.5178) and so the observation date is shifted to t=0 under branch (a) of the above procedure. In the stochastic forward looking rate processes of flow_3, the LIBOR fixing/observation date (t=1.0027) is after the choice time ($t_c$=0.5178) and so the observation date is shifted to the choice time ($t_c$=0.5178) under branch (b) of the above procedure.

Method 250 then proceeds to block 268. Block 268 involves taking the representation of the contract (as output from the last iteration of block 267) and replacing the processing elements of the block 267 representation with a list of individual processing functions output as valuation functions 124A (FIG. 6). In one particular embodiment, the objective of block 268 is to convert the representation of the contract into a non-recombining tree of individual computational functions (valuation functions) 124A which are either constants or instructions to perform a computational function on a set of inputs. The non-recombining nature of this tree of valuation functions 124A means that an input to any particular function within functions 124A does not depend either directly (or indirectly through another function) on the output of the particular function. In such embodiments, the output of the block 268 procedure involves a single, non-unique, ordered list of valuation functions 124A wherein the inputs of any one function are restricted to: the outputs of the operations preceding it in the list, non-stochastic values known (on the basis of model parameter sets 114A) or stochastic variables to be modeled in valuation 126.

In some embodiments, the potential block 268 valuation functions may include, without limitation, mathematical functions (e.g. PRODUCT, SUM, SUBTRACT, DIVIDE, NEGATION, AVERAGE, POWER, SQUARE ROOT, LOGARITHM, ABSOLUTE VALUE, WEIGHTED SUM, GET INTEGER PART, GET FLOATING POINT PART, FLOOR OF VALUE, ERF (Gaussian error function), ERFC (complementary Gaussian error function), boolean logical operations (e.g. NOT, XOR, MAKE LOGICAL), or other functions related to smoothing at discontinuities (e.g. IS LESS WITH SMOOTHING (a boolean function that evaluates a less than condition with smoothing (as described below)), SYMMETRIC COMPARISON (a boolean function that evaluates whether its arguments are the same with smoothing (as described below), MAX WITH SMOOTHING, and MIN WITH SMOOTHING) and/or the like.

A block 267 representation of example contract A is shown in FIG. 4B and is described in equation (18). One non-unique list of valuation functions 124A which may form the output of the block 268 non-recombining tree for example contract A is:

$a_0 = 0$ $a_1 = 100$ $a_2 = [D(1), \delta D(1)]$ $a_3 = \text{Acme\_stock\_price}(1)$ $a_4 = a_3 - a_1$ $a_5 = \text{MAX}[a_4, a_0]$ $a_6 = a_2 \cdot a_5$ \hfill (20)

It may be noted that in this list of functions (20), no $a_i$ depends from $a_j$ for $j \geq i$. This reflects the non-recombining nature of the functions in list (20).

Figure 5C:
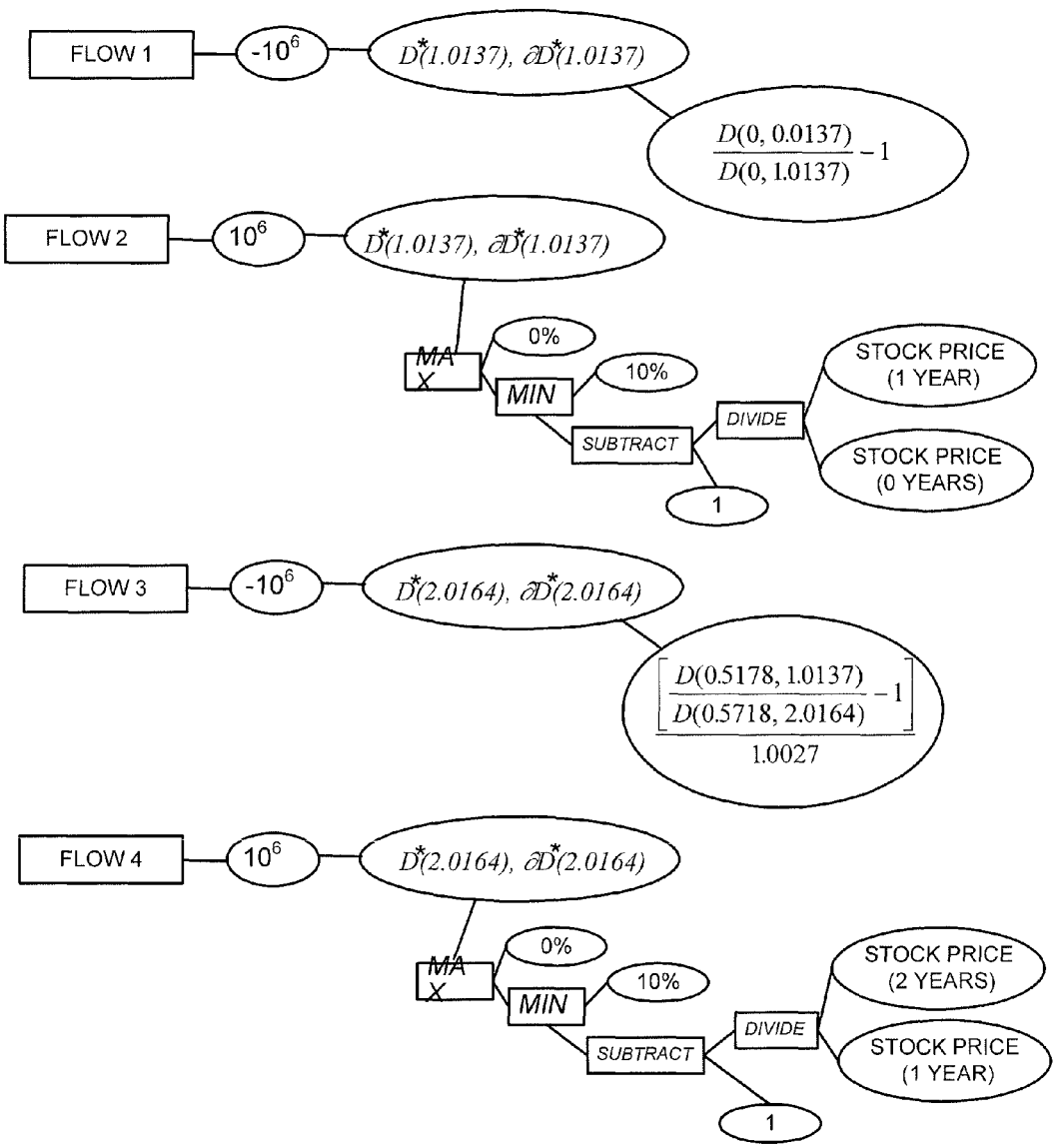

For example contract B, the block 267 representation is shown in FIG. 5C and is described in equations (19a)-(19f). One non-unique list of valuation functions 124A which may form the output of the block 268 non-recombining tree for example contract B is:

| | |
|---|---|
| $b_0 = 0$ | |
| $b_1 = 10\%$ | |
| $b_2 = 1$ | |
| $b_3 = 1.00274$ | length of 2nd LIBOR |
| $b_4 = 10^6$ | |
| $b_5 = \text{Acme\_stock\_price}(0)$ | |
| $b_6 = \text{Acme\_stock\_price}(1)$ | |
| $b_7 = \text{Acme\_stock\_price}(2)$ | |
| $b_8 = D^*(0, 1.1037)$ | |
| $b_9 = D^*(0, 1.0137)$ | |
| $b_{10} = D^*(0.5178, 1.0137)$ | (21) |
| $b_{11} = D^*(0.5178, 2.0164)$ | |
| $b_{12} = D^*(2.1064)$ | |
| $b_{13} = D^*(0.5178)$ | |
| $b_{14} = b_8/b_9$ | |
| $b_{15} = b_{14} - b_2$ | 1st roll LIBOR |
| $b_{16} = b_{10}/b_{11}$ | |
| $b_{17} = b_{16} - b_2$ | |
| $b_{18} = b_{17}/b_3$ | 2nd roll LIBOR |
| $b_{19} = b_4 b_{10} b_{15}$ | flow\_1 discounted to choice date |
| $b_{20} = b_6/b_5$ | |
| $b_{21} = b_{20} - b_2$ | |
| $b_{22} = \text{MIN}(b_1, b_{21})$ | |
| $b_{23} = \text{MAX}(b_0, b_{22})$ | |
| $b_{24} = b_4 b_{10} b_{23}$ | flow\_2 discounted to choice date |
| $b_{25} = b_4 b_{11} b_{18}$ | flow\_3 discounted to choice date |
| $b_{26} = b_7/b_6$ | |
| $b_{27} = b_{26} - b_2$ | |
| $b_{28} = \text{MIN}(b_{27}, b_1)$ | |
| $b_{29} = \text{MAX}(b_{28}, b_0)$ | |
| $b_{30} = b_{29} b_{11} b_4$ | flow\_4 discounted to choice date |
| $b_{31} = b_{30} + b_{24}$ | sum of positive flows |
| $b_{32} = b_{19} + b_{25}$ | sum of negative flows |
| $b_{33} = b_{31} - b_{32}$ | sum of all flows |
| $b_{34} = \text{MIN}(b_{33}, 0)$ | choose worst of 0 or contrract |
| $b_{35} = b_{34} b_{13}$ | contract discounted to valuation date |

In some embodiments, interpolative smoothing can be used in block 268 for functions which might otherwise have discontinuities. For example, MAX(x,0) has a discontinuity at x=0 which can cause problems with determining derivatives and associated risk (see block 270 described below). In some embodiments, evaluation functions such discontinuities can be smoothed as a part of block 268 by replacing such discontinuous functions with another function having a smoothing (interpolation) region around the discontinuity or by interpreting all such discontinuous functions to mean their smoothed counterpart. For example, MAX(x,y) can be replaced in block 268 by MAX_WITH_SMOOTHING(x,y) where MAX_WITH_SMOOTHING (x,y) is given (as a non-limiting example) by:

$$\text{MAX\_WITH\_SMOOTHING}(x, y) = \begin{cases} y & (x - y) \leq -a \\ x & (x - y) \geq a \\ \dfrac{((x - y) + a)^2}{4a} & -a \leq (x - y) \leq a \end{cases}$$

where a is a known (e.g. user-configurable, predetermined or automatically configured) smoothing parameter. The value of a contract and the associated risk may be determined as a function of the smoothing parameter a and then a limit can be taken as a→0. This exemplary MAX_WITH_SMOOTHING function could be used in the place of the MAX function in $a_5$ of equation (20) for example. Similar replacements could be used in the MIN and MAX functions of equation (21).

After block 268, method 250 proceeds to block 270 which involves determining the partial derivatives of valuation functions 124A and outputting these as valuation risk functions 124B. In some embodiments, this block 270 procedure may be performed by starting at the first block 268 valuation function $a_0$ and by building up successive partial derivatives using the various rules of calculus for simple functions (e.g. the chain rule, the product rule, the quotient rule, etc.). As will be shown by example below, for some types of block 268 valuation functions (e.g. MIN, MAX), block 270 may involve the creation of partial derivatives which depend on the values of the block 268 valuation functions and which may incorporate discontinuities. In some embodiments, smoothing may be applied to the block 268 valuation functions to avoid such discontinuities.

For example contract A, block 270 may involve determining valuation risk functions 124B based on the equation (20) valuation functions 124A as follows:

$\partial a_0 = 0$ \hfill (22)

$\partial a_1 = 0$ $\partial a_2 = \partial D(1)$ $\partial a_3 = \partial[\text{Acme\_stock\_price}(1)]$ $\partial a_4 = \partial a_3 - \partial a_1 = \partial a_3 = \partial[\text{Acme\_stock\_price}(1)]$ $\partial a_5 = \begin{cases} \partial a_4 & \text{if } a_4 > 0 \\ 0 & \text{otherwise} \end{cases}$ $\partial a_6 = a_2 \cdot \partial a_5 + a_5 \cdot \partial a_2 = \partial D(1) \text{MAX}[a_4, a_0] +$ $D(1) \begin{cases} \partial[\text{Acme\_stock\_price}(1)] & \text{if } a_4 > 0 \\ 0 & \text{otherwise} \end{cases}$ If the MAX function in $a_5$ of equation (20) was replaced by the exemplary MAX_WITH_SMOOTHING function discussed above, then $\partial a_5$ of equation (22) would be replaced with:

$$\partial a_5 = \begin{cases} \partial a_0 = 0 & (a_4 - a_0) \leq -\varepsilon \\ \partial a_4 & (a_4 - a_0) \geq \varepsilon \\ \frac{1}{2\varepsilon}[(a4 - a0 + \varepsilon)]\partial a_4 & -\varepsilon \leq (a_4 - a_0) \leq \varepsilon \end{cases} \quad (22a)$$

Valuation risk functions 124B may be similarly determined based on valuation functions 124A for the example contract B valuation functions described above in equation (21), but, for brevity, are not reproduced here. Valuation risk functions 124B may be similarly determined for any other contract based on valuation functions 124A.

Method 250 (and block 122 (FIG. 1)) conclude with the output of valuation functions 124A and valuation risk functions 124B. Method 100 (FIG. 1) then proceeds to block 126 which involves simulating a contract and its associated risk (as represented by valuation functions 124A, valuation risk functions 124B, model parameter sets 114A and model risk matrices 114B) to predict expected values for the contract and its first order associated risk. The expected values for the contract and its associated risk may form part of valuation results 128. Valuation results 128 may generally comprise expected values for any of valuation functions 124A and valuation risk functions 124B. Valuation results 128 may also comprise other statistical information about simulated values of the contract, simulated values of any of valuation functions 124A and/or their associated valuation risk functions 124B. Such statistical information may include histograms, variance or deviation estimates or the like.

As discussed above, a user will typically specify (via valuation details 108) which of the variables in valuation functions 124A and valuation risk functions 124B are to be treated as stochastic variables and which of the variables in valuation functions 124A and valuation risk functions 124B are to be treated as non-stochastic. In these cases, the block 126 valuation simulation may comprise: generating a valuation set which specifies values for the stochastic variables; and executing valuation functions 124 over this valuation set. Each element of the block 126 valuation set may specify one value for each stochastic variable in valuation functions 124. Block 126 may involve computing valuation functions 124 (and their associated risks) for each element of the block 126 valuation set. Each element of the block 126 valuation set may be referred to as a set of stochastic process values of the block 126 valuation and the corresponding values of valuation functions 124 (and their associated risks) may be referred to as a set of simulated values for the contract being valuated. It will be appreciated that there is a one-to-one correspondence between the block 126 stochastic process values and the corresponding simulated values.

The number of elements (sets of stochastic process values) in the block 126 valuation set and the corresponding number of sets of simulated values generated in block 126 may be user-configurable (e.g. through valuation details 108). For example, valuation details 108 may specify that the block 126 valuation is to involve evaluation of 1,000 sets of stochastic process values to generate 1,000 corresponding sets of simulated values. Additionally or alternatively, valuation details 108 may specify that the block 128 valuation simulation should run for a user-configurable period of time or until interrupted by a user and involve generating a corresponding number of sets of stochastic process values and evaluating a corresponding number of sets of simulated values. The expected value of the contract (or any of valuation functions 124) may then be determined as a part of block 126 to be the average value of the contract (or valuation function) over the valuation set or the corresponding sets of stochastic process values—e.g. the sum of the value of the contract for each set of stochastic process values in the valuation set divided by the number of sets of stochastic process values in the valuation set. The expected value of the associated risk may be determined in a similar manner. These expected values are output as part of valuation results 128. In the special case where all of the variables in valuation functions 124A are specified to be non-stochastic, then the block 126 valuation may involve a single evaluation of valuation functions 124A and their corresponding valuation function risks 124B and no averaging or statistical processing is necessary.

Figure 7:
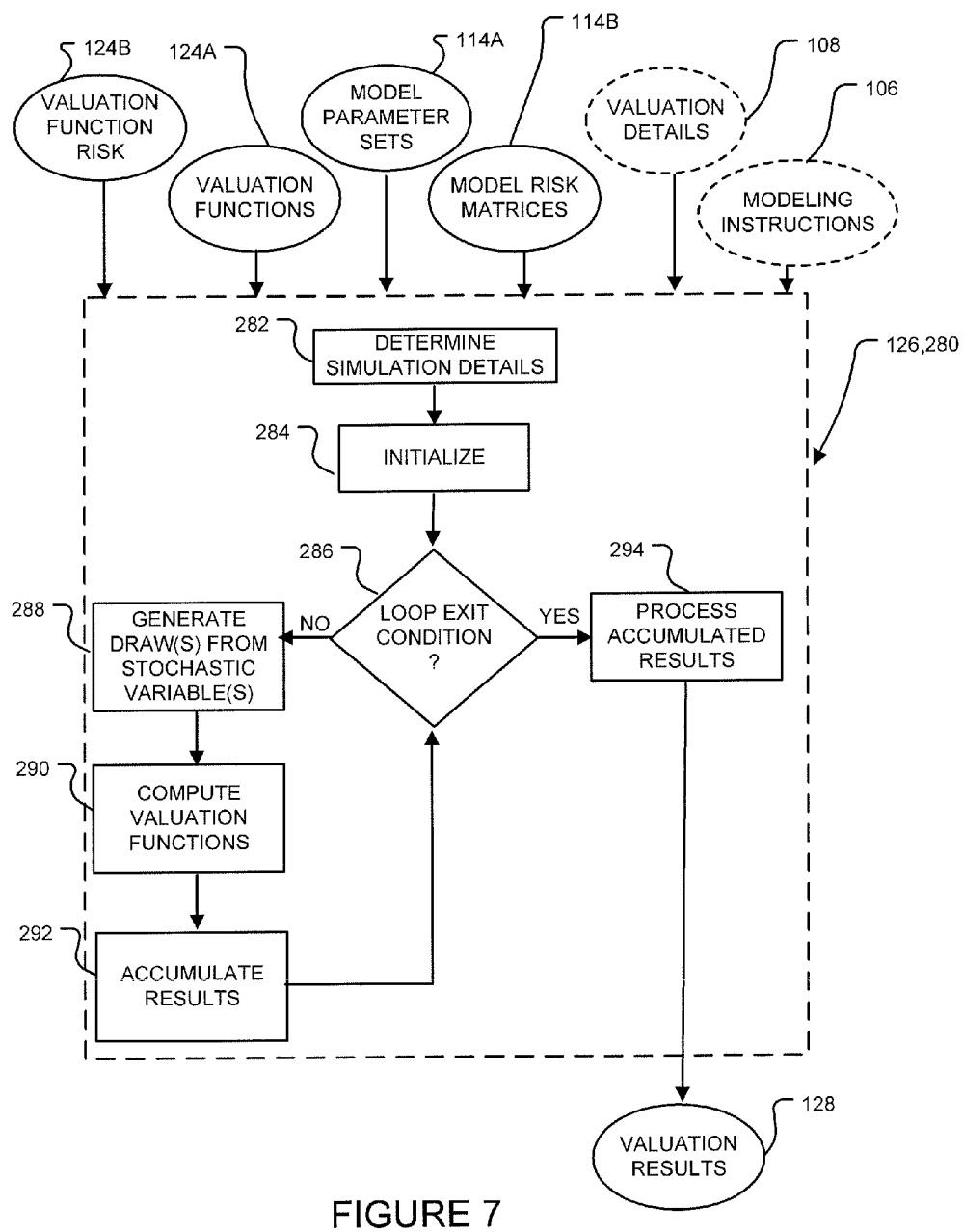
FIG. 7 is a block diagram depiction of a method for evaluating the FIG. 6 valuation functions suitable for use with the FIG. 1 valuation method according to a particular embodiment.

FIG. 7 schematically depicts a method 280 suitable for implementing the block 126 valuation according to a particular embodiment. Method 280 receives (as inputs), model parameter sets 114A, associated model risk matrices 114B, valuation functions 124A, associated valuation function risk 124B and, optionally, modeling details 106 and/or valuation details 108. Method 280 performs a simulation which valuates the contract (and the associated risk) and outputs valuation results 128. Method 280 commences in block 282 which involves determining the details for the method 280 simulation. Block 282 may involve, by way of non-limiting example: ascertaining the variables which are to be treated stochastically during the bock 280 simulation (i.e. determining a set of stochastic variables which, when defined, will provide one set of stochastic process values for a valuation set), determining the number of sets of stochastic process values to be simulated in the valuation set, determining some other criteria for determining the size of the valuation set, determining some other criteria for exiting the simulation loop, determining the distribution properties of the stochastic processes being simulated (e.g. is the process normally distributed, log-normally distributed or distributed according to some other model) and/or the like. Some of the information used in block 282 to determine the simulation details may be provided by user input and may be contained in valuation details 108. Some of the information used in block 282 may be coded into computer system 110.

Method 280 then proceeds to block 284 which involves initializing an accumulation data structure prior to simulation. Typically, the block 284 initialization will involve setting values in the accumulation data structure to zero. The accumulation data structure initialized in block 284 may be used throughout the rest of method 280. In one particular embodiment, the only functions of interest are: the valuation function 124A corresponding to the contract value and any corresponding valuation risk functions 124B. In such embodiments, the accumulation data structure initialized in block 284 may comprise one field for the contract valuation function 124A corresponding to the contract value and a number of additional fields corresponding to the partial derivative functions 124B of the contract value. For example, in the case of example contract A, the valuation function 124A corresponding to the contract value is $a_6$ and its corresponding risk functions include $\partial a_b$, $\partial a_5$, $\partial a_4 = \partial a_3$ and $\partial a_2$. Thus, the accumulation data structure initialized in block 284 may comprise five fields corresponding to the example contract A value and its corresponding risk functions 124B. Method 280 is not limited, however, to embodiments where the only function of interest in valuation functions 124A is the contract value. In other embodiments, the data structure initialized in block 284 and used in method 280 may comprise fields corresponding to any valuation functions 124A and any of their associated partial derivatives 124B. Block 284 may also involve initializing an iteration counter or the like which may be used to evaluate the block 286 loop exit condition explained in more detail below.

After initialization in block 284, method 286 proceeds to block 286 which involves evaluation of a loop exit condition. The block 286 loop exit condition may be related to a number of sets of stochastic process values in the block 126 valuation set (i.e. the number of sets of stochastic process values to be simulated in method 280), a time for which method 280 may be carried out, a specific user trigger to discontinue the method 280 simulation and/or the like. As discussed above, the information which may be used to specify the block 286 loop exit condition may be user-configurable and may be provided as part of valuation details 108. On the first iteration of method 280, the block 286 evaluation is likely to be negative (block 286 NO output) and so method 280 will proceed to block 288.

Block 288 involves generating a draw from each of the stochastic variables in valuation functions 124 (i.e. one set of stochastic process values). As discussed above, the particular variables within valuation functions 124 to be treated as stochastic may be user-specified (e.g. via valuation details 108). Generating a draw from each of the stochastic variables in valuation functions 124 involves setting one value for each of the stochastic variables in valuation functions 124 and thereby specifying a corresponding set of stochastic process values for the block 280 simulation.

Generating a random draw from a stochastic variable with a known distribution is a process well known in the art. Techniques for generating random draws from known distributions include, by way of non-limiting example, Monte Carlo techniques and/or other similar techniques. In a simple case, for a stochastic variable X having a cumulative distribution function (CDF) F(x) which represents the probability that X≤x, making a draw from this distribution may involve: generating a random (or pseudo random or quasi random) number u that is uniformly distributed in a range [0,1] and solving u=F(x) to obtain a draw x from the distribution of the stochastic variable X. The random number u can be generated by a wide variety of techniques for random (or pseudo random or quasi random) number generation known in the art. Such techniques include, by way of non-limiting example, Sobol, Inversive congruential generator, ISAAC (cipher), Lagged Fibonacci generator, Linear congruential generator, Linear feedback shift register, Mersenne twister, Multiply-with-carry, Maximal periodic reciprocals, Xorshift and the like.

In the general case, however, generating a set of stochastic process values in block 288 is not as easy as solving u=F(x) to obtain a draw x, because, among other possible reasons: (i) block 288 may often involve generating a number of samples $\{x_i\}$ of a random variable X at a corresponding number of times $\{t_i\}$ and the probability of particular samples values at particular times may depend on earlier values of the random variable (e.g. on a conditional probability distribution). This may be referred to as serial or temporal correlation of draws within a single random process; (ii) block 288 may involve generating samples $\{x_i\}$, $\{y_i\}$ . . . for a number of different random variables X, Y, . . . and these random variables X, Y, . . . may be specified to have a cross-correlation with one another; (iii) the functional form of the distribution to which the random variables belong may be computationally difficult to work with.

Figure 8:
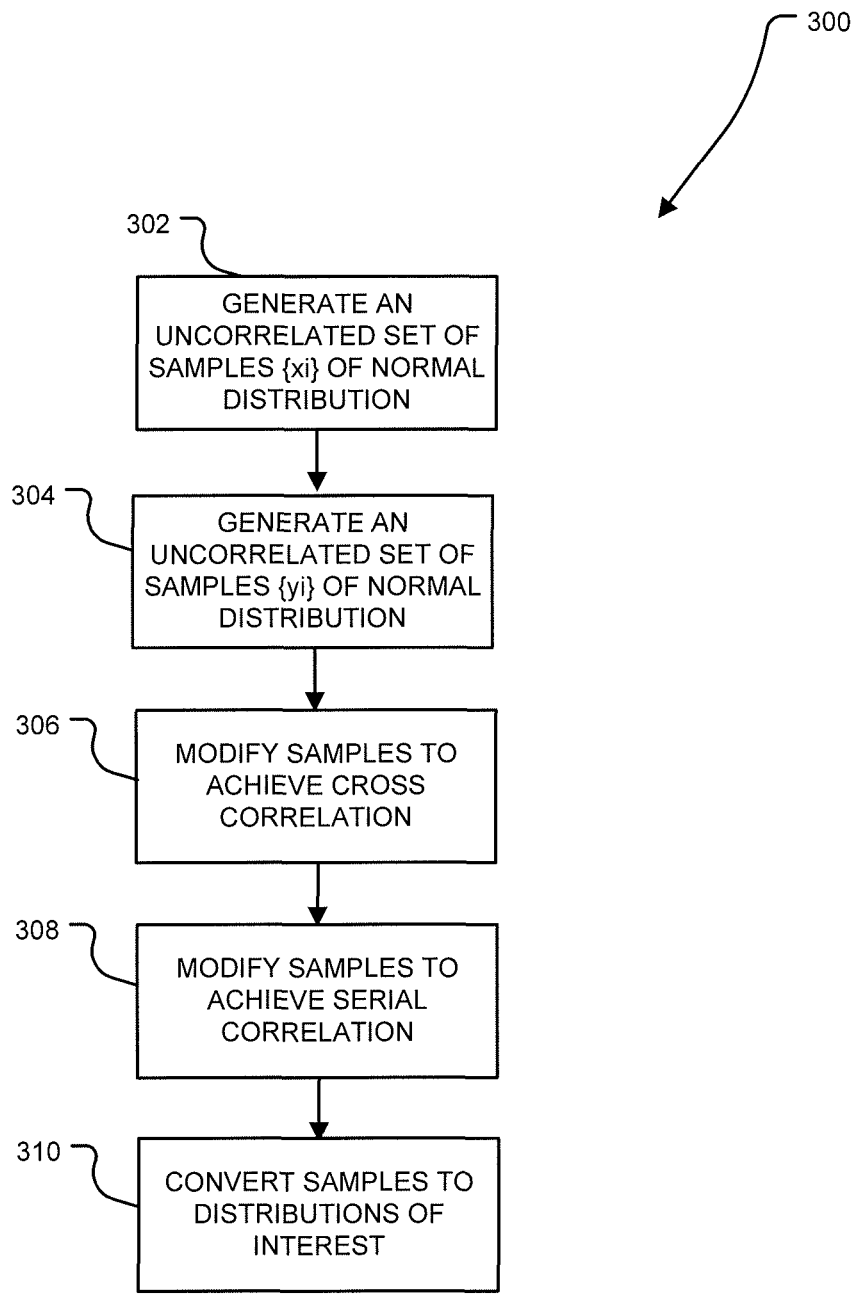
FIG. 8 is a block diagram depiction of an exemplary method for generating random draws of stochastic variables.

FIG. 8 shows a high level example method 300 for the block 288 process of generating a set of stochastic process values. Method 300 assumes that for computation of valuation functions 124A and their associated risk function 124B, it is desirable to know values $\{x_i\}$ for a random variable X at a set of times $\{t_i\}$ and values $\{y_i\}$ for a random variable Y at the same set of times. Method 300 begins in block 302 which involves generating a series of values $\{x_i\}$ for a normally distributed random variable at a set of times $\{t_i\}$ which corresponds to the times of interest in valuation functions 124A. Initially, the block 302 set of values $\{x_i\}$ exhibits no serial correlation. In block 302, method 300 generates a series of values $\{y_i\}$ for a normally distributed random variable at the set of times $\{t_i\}$. Initially, the block 304 set of values $\{y_i\}$ exhibits no serial correlation. In block 306, method 300 involves processing the values $\{x_i\}$ and/or $\{y_i\}$ to provide the desired cross-correlation (which may be specified by valuation details 108 and/or modeling instructions 106). Method 300 then proceeds to block 308 which involves further processing the values $\{x_i\}$ and/or $\{y_i\}$ such that the values $\{x_i\}$ and/or $\{y_i\}$ exhibit any desired serial correlation (which may be specified by valuation details 108 and/or modeling instructions 106). It should be noted here that in some embodiments, it may be desirable to reverse the order of blocks 306 (cross correlation) and blocks 308 (serial correlation). In some embodiments, the order of blocks 306, 308 may be model dependent. In block 310, method 300 involves processing the samples $\{x_i\}$ and/or $\{y_i\}$ to convert them from a normal distribution to the distribution(s) which may be specified by valuation details 108 and/or modeling instructions 106. In some embodiments, method 300 can work directly with a distribution other than normal distribution (i.e. the block 302 and 304 draws are based on distributions other than normal distributions) in which case, block 310 might not be required.

Returning to FIG. 7, block 288 concludes by outputting a draw from each of the stochastic variables in valuation functions 124A for each of the times of interest in valuation functions 124A (i.e. one set of stochastic process values).

Once a particular set of stochastic process values is obtained in block 288, method 280 proceeds to block 290 which involves using the block 288 set of stochastic process values (i.e. one value for each stochastic variable in valuation functions 124A for each time of interest) and then computing the valuation functions 124A and associated valuation risk functions 124B of interest. In general, block 290 may involve computing any of valuation functions 124A and/or valuation function risks 124B of interest in connection with the contract being valuated. In some embodiments, however, block 290 may involve computing a subset of these valuation functions 124A and/or valuation function risks 124B.

After calculating valuation functions 124A and valuation function risks 124B of interest, method 280 proceeds to block 292 which involves accumulating the output of block 290 into the accumulation data structure. In general, the block 292 accumulation procedure may add a record to the accumulation data structure for each iteration of block 290—e.g. block 292 may involve storing all of valuation functions 124A and valuation function risks 124B computed in block 290 as a separate record in the accumulation data structure. Maintaining such a comprehensive accumulation data structure may be useful if it is desired to extract statistical information (other than the expected contract value and associated risk) from the method 280 simulation. In some embodiments, however, the information of interest in the method 280 simulation may be more basic. For example, in some embodiments, information of interest in the method 280 simulation may be limited to the expected contract value and the risk associated with variations in one or more parameters or market observables. In such embodiments, the block 292 accumulation procedure may involve adding a record to the accumulation data structure that includes the expected contract value and associated partial derivatives computed in block 290. Alternatively, in some embodiments, the accumulation data structure may contain only a single record comprising fields for the expected contract value and the associated partial derivatives. Where the accumulation data structure has such a single record structure, the block 292 accumulation procedure may involve adding the block 290 expected contract value to the contract value field and the block 290 partial derivatives to their associated partial derivative fields. In such a case, the accumulation data structure may have the following form:

$$\left[ \sum_{i=1}^{n} V_i \quad \sum_{i=1}^{n} \frac{\partial V_i}{\partial q_1} \quad \sum_{i=1}^{n} \frac{\partial V_i}{\partial q_2} \quad \cdots \quad \sum_{i=1}^{n} \frac{\partial V_i}{\partial q_m} \right] \quad (24)$$

where: i is an index over the sets of stochastic process values; n is the current set of stochastic process values; $V_i$ is the block 190 value of the contract for the $i^{th}$ set of stochastic process values (e.g. the $i^{th}$ iteration of block 190); and $q_1, q_2, \ldots q_m$ represent the various variables associated with the contract value V for which there are partial derivatives.

After the results are accumulated in block 292, method 280 returns to the block 286 evaluation to determine whether the simulation should be discontinued. Method 280 loops through blocks 286, 288, 290 and 292 until the block 286 loop exit condition is satisfied (block 286 YES output) and then proceeds to block 294. Block 294 involves processing the accumulated results (i.e. the results contained in the accumulation data structure after the last iteration of block 292) before outputting these processed results as valuation results 128. In one particular embodiment, where the accumulation data structure has the form of equation (24), the block 294 processing may involve computing the average for each field of the accumulation data structure by dividing the value in the field by the number of sets of stochastic process values (i.e. the number of iterations of blocks 288, 290 and 292. This will yield an average value of the contract $\bar{V}$ (over the method 280 valuation set):

$$\bar{V} = \frac{1}{N} \sum_{i=1}^{N} V_i \quad (25)$$

and the average values of the partial derivatives (over the method 280 sample paths):

$$\overline{\left[\frac{\partial V}{\partial q_1}\right]} = \frac{1}{N} \sum_{i=1}^{N} \frac{\partial V_i}{\partial q_1} \quad (26a)$$

$$\overline{\left[\frac{\partial V}{\partial q_2}\right]} = \frac{1}{N} \sum_{i=1}^{N} \frac{\partial V_i}{\partial q_2} \quad (26b)$$

$$\vdots$$

$$\overline{\left[\frac{\partial V}{\partial q_m}\right]} = \frac{1}{N} \sum_{i=1}^{N} \frac{\partial V_i}{\partial q_m} \quad (26m)$$

where N is the number of sets of stochastic process values. In other embodiments, where the accumulation data structure stores more information, the block 294 processing may involve generating of other statistical information in relation to the method 280 simulation. By way of non-limiting example, such statistical information could include expected values (averages) and/or deviations of any of the other valuation functions 124A (and their associated valuation risk functions 124B), histogram information about the contract value any of the associated valuation risk functions 124B, any other valuation functions 124A, and/or their associated valuation risk functions 124B.

Ultimately, the information generated via processing in block 294 may be output as valuation results 128. Valuation results 128 include the expected value of financial contract 102 as estimated by method 100. Valuation results 128 also include expected values for one or more of valuation risk functions 124B. As explained below, valuation risk functions 124B comprise partial derivatives of valuation functions 124A with respect to their constituent components. The partial derivatives corresponding to the particular valuation function 124A which estimates the value of contract 102 provide a first order risk estimate for the value of contract 102 in relation to its constituent components. For example, the valuation function 124A corresponding to the value of example contract A is $a_6$ from equation (20) set out above. The corresponding valuation risk function 124B for the value of contract A is $\delta a_b$ in equation (22) set out above.

Advantageously, method 100 involves parsing all of the risk elements (derivatives) into manageable sub-elements from model formation process 111 through to valuation in block 126. This derivative parsing permits method 100 and computer system 110 to determine the risk exposure of the estimated value of contract 102 to a wide variety of variables which may include exposure to: random processes that form part of the block 126 simulation, model values, model parameters, and in some cases down to one or more pieces of market data 104. For example, the valuation risk function 124B for the value of example contract A is $\Delta a_6$ in equation (22) expresses the first order exposure (risk) of the estimated value of example contract A to the random variable for the price of Acme stock at a time t=1 (i.e. $\delta[\text{Acme\_stock\_price}(1)]$) and to the non-stochastic model for the discount factor at a time t=1 (i.e. $\partial D(1)$). However, the exposure to the non-stochastic model for the discount factor $\partial D(1)$ may be further parsed down (via the partial derivative of equation (4)) to provide the exposure/risk of the value of example contract A to the parameter $q_0$ of the equation (3) discount factor model. The equation (4) partial derivative may be provided as part of model risk matrix 114B for the equation (3) discount function D(t). The exposure of the example contract A value to the parameter $q_0$ may be even further parsed down (via the partial derivative of equation (13)) to provide the exposure/risk of the value of example contract A to the market data 104 quoted rate r for a 1 year loan. The equation (13) partial derivative may be provided as part of model risk matrix 114B for the equation (3) discount function D(t).

Accordingly, the valuation risk functions 124B (together with the model risk matrices 114B) for the value of example contract A provides a wide variety of risk information which may be used to assess the risk associated with example contract A for variation in: the price of Acme stock at a time t=1, the non-stochastic model for the discount factor at a time t=1 (i.e. D(1)), the parameter $q_0$ of the equation (3) discount model and the market quote r for a 1 year loan. Because of the way that the risk is parsed into multiple components, the first order risk assessments to any of these variables are easily calculated. Such risk assessments may be evaluated as a part of the processing in block 294 and may be presented as a part of valuation results 128.

The risk assessment provided by valuation risk functions 124B (together with the model risk matrices 114B) represents a first order risk assessment. This risk assessment is generally useful for small changes in the underlying variables. Sometimes, however, the processes that govern the relationships between these underlying variables and the value of a contract are non-linear and so the risk/exposure estimates provided by valuation risk functions 124B (together with the model risk matrices 114B) may loose accuracy for large changes in the underlying variables. In such instances it may be desirable to perform some optional auxiliary analysis to obtain more comprehensive risk assessment results. Such analysis may be referred to herein as scenario analysis and may be performed in optional block 130 to provide scenario results 132.

Up until scenario analysis in block 130, method 100 has used a set $S_0$ of market data 104 to generate a value $V_0$ for contract 102. The set $S_0$ of market data 104 is real market data 104. In general, the block 130 analysis involves generating a number of sets $S_i$ of fictitious market data 104 (perhaps according to some rule or according to a user defined scenario) or fictitious model parameters and performing method 100 on each set $S_i$ of market data 104/model parameters to obtain a corresponding value $V_i$ for contract 102. The resultant values $V_i$ (or some functions or the like based on the resultant values $V_i$) may then be reported as scenario results 132. One non-limiting example of a scenario may involve a set $S_1$ of market data wherein all stock prices are raised by 10% and scenario results 132 are generated which report the difference in the value of contract 102 (i.e. $V_1 - V_0$). Another non-limiting example of a scenario involves moving all rate curves according to a set $\{S_j\}$ of N prescribed scenario changes and generating scenario results 1332 which report an average change in the value of contract 102 (i.e.

$$\sum_i \frac{(V_i - V_0)}{N}.$$

Block 130 scenario analysis and its corresponding scenario results 132 can be used, for example, where one would like an assessment of risk for larger changes in market data 104 or model parameters. Block 130 scenario analysis and its scenario results 132 may complement the assessment of risk provided by risk valuation functions 114B. Block 130 scenario analysis and scenario results 132 can also be used by financial institutions to produce regulatory statistics. For example, regulations may require financial institutions to keep a certain amount of capital in reserve and that reserve capital may be related to the risk associated with a set of investments. Block 130 scenario analysis and scenario results 132 may be used to assess whether an institution has enough reserve capital to handle a potential downturn. Also, the block 130 scenario analysis and its scenario results 132 can be used to assess past performance of a modeling technique (e.g. method 100) by using historical market data 104 and/or model parameters and assessing the performance of the modeling technique.

Certain implementations of the invention comprise computer processors which execute software instructions which cause the processors to perform a method of the invention. For example, computer system 110 may comprise one or more processors that implement methods as described herein by executing software instructions from a program memory accessible to the processors. The invention may also be provided in the form of a program product. The program product may comprise any medium which carries a set of computer-readable data comprising instructions which, when executed by a data processor, cause the data processor to execute a method of the invention. Program products according to the invention may be in any of a wide variety of forms. The program product may comprise, for example, physical media such as solid state memory, magnetic data storage media including floppy diskettes, hard disk drives, optical data storage media including CD ROMs, DVDs, electronic data storage media including ROMs, flash RAM, or the like. The computer-readable data on the program product may optionally be compressed or encrypted.

Where a component (e.g. a controller, computer system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

The embodiments described herein are only examples. Other example embodiments may be obtained, without limitation, by combining features of the disclosed embodiments. As will be apparent to those skilled in the art in the light of the foregoing disclosure, many alterations and modifications are possible in the practice of this invention without departing from the spirit or scope thereof. Such alterations and modifications may include, for example:

Modeling instructions 106 and valuation details 108 are shown in FIG. 1 as inputs to method 100 and to computer system 110. This is not necessary. In some embodiments, valuation details 108, modeling instructions 106 and/or suitable portions thereof may be directly coded into computer system 110. By way of non-limiting example, computer system 110 could be programmed to provide modeling instructions 106 (or a portion of modeling instructions 106) by programming computer system 110 to include functions which define models and their partial derivatives based on corresponding parameter sets.

It is therefore intended that the following appended claims and claims hereafter introduced are interpreted to include all such modifications, permutations, additions and sub-combinations as are within their true spirit and scope.

What is claimed is:

1. A method for estimating an expected value of a financial contract, the method comprising:
   receiving observable market data;
   calibrating one or more financial models using the market data to obtain estimates for one or more model parameters corresponding to each of the one or more financial models;
   generating a set of model risk metrics, the set of model risk metrics comprising:
   for each of the one or more financial models, one or more corresponding financial model partial derivative functions representing a rate of change of the financial model with respect to each of its corresponding model parameters; and
   for each of the model parameters, one or more corresponding model parameter partial derivative functions representing a rate of change of the model parameter with respect to each of the market data,
   parsing the contract into a set of contract valuation functions, the set of contract valuation functions depending, at least in part, on a subset of the model parameter estimates and the set of contract valuation functions including an ultimate contract valuation function representative of the value of the contract;

generating a set of contract valuation risk functions corresponding to the set of contract valuation functions, each of the set of contract valuation risk functions comprising one or more partial derivatives of a corresponding contract valuation function with respect to all inputs to the corresponding contract valuation function;

estimating an expected value for the contract, the expected value for the contract comprising an expected value for the ultimate contract valuation function; and estimating one or more expected values for risk of the contract, each expected value for the risk of the contract comprising an expected value for one of the contract valuation risk functions corresponding to the ultimate contract valuation function.

2. A method according to claim 1 wherein receiving the market data, calibrating the one or more financial models to obtain the model parameter estimates and generating the set of model risk metrics are performed independently of information relating to the contract.

3. A method according to claim 1 wherein the market data comprises at least one of:
current market data and historical market data.

4. A method according to claim 1 wherein the market data comprises publicly available data corresponding to one or more contracts, the one or more contracts comprising one or more of: a borrowing contract; an interest rate swap contract; an interest rate future contract; a bond future contract; a government bond contract; an interest rate cap contract; an interest rate floor contract; option contracts; stock purchase and sale contracts; currency exchange rate contracts; contracts based on commodity prices; contracts based on commodity swaps; contracts based on stock market indice; repurchase agreements; default credit swap contracts; basis swap contracts and collateralized debt obligations.

5. A method according to claim 1 wherein the market data comprises an expected value of a pre-cursor contract, the expected value of the pre-cursor contract previously estimated using the method of claim 1.

6. A method according to claim 1 wherein receiving the observable market data comprises receiving one or more user-specified direct inputs as part of the market data, wherein a user specifies a value for each of the one or more user-specified direct inputs.

7. A method according to claim 6 wherein the value of at least one of the one or more user-specified direct inputs is at the discretion of the user.

8. A method according to claim 1 wherein calibrating the one or more financial models to obtain model parameter estimates comprises receiving one or more user-specified direct model parameter inputs as part of the model parameter estimates, wherein a user specifies a value for each of the one or more user-specified direct model parameter inputs.

9. A method according to claim 1 wherein the one or more financial models comprise at least one of: one or more discount models for valuation of future cash flows; a Black Scholes model for valuation of options; a Hull-White model for valuation of future rates; one or more models for valuation of a forward price of an asset.

10. A method according to claim 1 wherein the one or more financial models comprise one or more model functions for modeling uncertainty in forward prices or uncertainty in forward rates, the one or more model functions comprising at least one of: one or more discount models for valuation of future cash flows; a Black-Scholes model, a normal model, a shifted log-normal model, a Heston model, a constant elasticity variance (CEV) model, a stochastic alpha, beta, rho (SABR) model, a Lévy model, an affine jump diffusion model, a Hull-White model, a LIBOR market model, a Vasicek model, a Black-Karasinski model; and one or more models for valuation of a forward price of an asset.

11. A method according to claim 1 wherein calibrating the one or more financial models to obtain the model parameter estimates corresponding to each of the one or more financial models comprises, for at least one of the one or more financial models, using an iterative curve-fitting process to generate a set of model parameter estimates which, in conjunction with their corresponding financial model, acceptably predict the observable market data.

12. A method according to claim 11 wherein using the iterative curve-fitting process comprises evaluating a cost function comprising a metric representative of a difference between the observable market data and market data predicted by the financial model using its model parameter estimates.

13. A method according to claim 12 wherein the set of model parameter estimates which acceptably predict the market data comprises one or more of: a set of model parameter estimates which minimize the cost function; a set of model parameter estimates corresponding to a value of the cost function below a threshold level; a set of model parameter estimates corresponding to a threshold number of iterations of the iterative curve-fitting process; a set of model parameter estimates corresponding to an iteration of the curve fitting process where a user forces the curve fitting process to complete.

14. A method according to claim 1 wherein generating the set of model risk metrics comprises, for at least one of the one or more financial models:
accessing one or more model derivative functions which describe a rate of change of the financial model with respect to each of its corresponding model parameters in terms of at least one of known constants, the observable market data and the model parameters;
evaluating the one or more model derivative functions using the observable market data and substituting the model parameter estimates for the model parameters as required;
accessing one or more parameter derivative functions which describe the rate of change of the model parameters with respect to each of the market data in terms of at least one of known constants, the observable market data and the model parameters; and
evaluating the one or more parameter derivative functions using the observable market data and substituting the model parameter estimates for the model parameters as required.

15. A method according to claim 14 wherein at least one of the one or more model derivative functions comprises a numerically determined estimate of the rate of change of the financial model with respect to one of its corresponding model parameters.

16. A method according to claim 14 wherein at least one of the one or more parameter derivative functions comprises a numerically determined estimate of the rate of change of the corresponding model parameter with respect to each of the market data.

17. A method according to claim 14 wherein generating the set of model risk metrics comprises, for at least one of the one or more financial models, assembling the evaluated model derivative functions and the evaluated parameter derivative functions into a matrix.

18. A method according to claim 1 wherein the set of model risk metrics comprises, for at least one of the one or more financial models, a rate of change of the financial model with respect to a different one of the one or more financial models.

19. A method according to claim 1 wherein the set of model risk metrics comprises, for at least one of the model parameters, a rate of change of the model parameter with respect to a different one of the one or more financial models.

20. A method according to claim 1 wherein parsing the contract into a set of contract valuation functions comprises expressing the contract in terms of an internal contract representation, the internal contract representation comprising a combination of processing functions and observable contract data.

21. A method according to claim 20 wherein expressing the contract in terms of the internal contract representation comprises at least one of:
receiving the internal contract representation from an external source; and
receiving a different machine representation of the contract from an external source and generating the internal contract representation based on the different machine representation.

22. A method according to claim 20 wherein the internal contract representation comprises one or more flow set functions, each flow set function comprising one or more cash flow functions, each cash flow function representing an actual cash flow amount and each cash flow function specified by cash flow parameters comprising: a date of the cash flow, a currency of the cash flow, a notional amount of the cash flow and a direction of the cash flow which specifies whether the cash flow is outgoing or incoming.

23. A method according to claim 22 wherein the cash flow parameters comprise a rule, the rule comprising a processable function having a result which is determinable by processing observable contract data, the observable contract data determinable at a time of evaluation of the rule.

24. A method according to claim 23 wherein the rule prescribes a mapping between the notional amount of the cash flow and the actual cash flow amount.

25. A method according to claim 22 wherein at least one of the flow sets comprises at least one choice function, the at least one choice function comprising at least one of:
one or more choose best functions, each choose best function representing a direction to choose a best option for a contract holder between a plurality of choose best choice branches at a corresponding choose best choice time, each choose best choice branch comprising at least one of: a downstream choose best flow set; and a downstream choose best choice function; and
one or more choose worst functions, each choose worst function representing a direction to choose a worst option for the contract holder between a plurality of choose worst choice branches at a corresponding choose worst choice time, each choose worst choice branch comprising at least one of: a downstream choose worst flow set; and a downstream choose worst choice function.

26. A method according to claim 22 wherein:
at least one of the flow sets comprises one or more trigger functions, each trigger function representing a conditional trigger flow set, each trigger function specified by one or more trigger parameters comprising: the trigger flow set; a time of the trigger; and a trigger condition;
the trigger condition comprises boolean evaluation criteria for a trigger rule which specifies that the trigger flow set will be triggered if true and that the trigger flow set will not be triggered if false; and
the trigger rule comprises a processable function having a result which is determinable by processing observable contract data, the observable contract data determinable at a time of evaluation of the trigger rule.

27. A method according to claim 22 comprising receiving valuation details, the valuation details comprising one or more of: a valuation time at which the contract should be valuated; one or more particular financial models to be used for model valuation of the contract, the one or more particular financial models selected from among the one or more financial models; and an indication of a set of stochastic variables within the one or more particular financial models which should be treated stochastically for purposes of estimating the expected value of the contract and estimating the one or more expected values of the risk of the contract.

28. A method according to claim 27 wherein parsing the contract into the set of contract valuation functions comprises processing the internal contract representation to insert one or more discount factor models into the internal contract representation for one or more corresponding cash flow functions having cash flow dates that occur after the valuation time, the one or more discount factor models selected from among the one or more particular financial models.

29. A method according to claim 27 wherein parsing the contract into the set of contract valuation functions comprises:
processing the internal contract representation to insert one or more discount factor models into the internal contract representation for one or more corresponding cash flow functions having cash flow dates that occur after the valuation time, the one or more discount factor models selected from among the one or more particular financial models; and
processing the internal contract representation to insert a model risk metric associated with each of the one or more discount factor models into the internal contract representation, the model risk metric associated with each of the one or more discount factor models selected from among the set of model risk metrics.

30. A method according to claim 28 wherein parsing the contract into the set of contract valuation functions comprises processing the internal contract representation to insert, into the internal contract representation, values for non-stochastic variables within the one or more particular financial models.

31. A method according to claim 29 wherein parsing the contract into the set of contract valuation functions comprises:
processing the internal contract representation to insert, into the internal contract representation, values for non-stochastic variables within the one or more particular financial models; and
processing the internal contract representation to insert, into the internal contract representation, a model risk metric associated with each of the non-stochastic variables, the model risk metric associated with each of the non-stochastic variables selected from among the set of model risk metrics.

32. A method according to claim 27 wherein parsing the contract into the set of contract valuation functions comprises:
if the internal contract representation comprises a choice function having one or more stochastic forward looking rate processes in one of its choose best parameters or in one of its choose worst parameters, then adjusting observation times of the one or more stochastic forward looking rate processes in the choose best parameters or in the choose worst parameters, so that the one or more stochastic forward looking rate processes can be observed at one or more consistent times.

33. A method according to claim 32 wherein adjusting the observation times of the one or more stochastic forward looking rate processes in the choose best parameters or in the choose worst parameters comprises, for each stochastic forward looking rate process, adjusting the observation time of the stochastic forward looking rate process to a time which is a latter of:
   the valuation time; and
   a choice time $t_c$ of the choice function having the stochastic forward looking rate process in one of its choose best parameters or in one of its choose worst parameters, if the choice time $t_c$ occurs before an original observation time of the stochastic forward looking rate process.

34. A method according to claim 32 wherein the stochastic forward looking rate processes in the choose best parameters or in the choose worst parameters comprise at least one discount factor.

35. A method according to claim 27 wherein parsing the contract into the set of contract valuation functions comprises converting the internal contract representation into the set of contract valuation functions, each valuation function comprising a constant or a computational function having a set of inputs and wherein the set of contract valuation functions comprises an ordered list of valuation functions for which the set of inputs for any individual valuation function is restricted to: outputs of preceding valuation functions in the ordered list; non-stochastic variables within the one or more particular financial models; and the set of stochastic variables within the one or more particular financial models.

36. A method according to claim 35 wherein the ordered list of valuation functions is not unique.

37. A method according to claim 35 comprising approximating one or more valuation functions with discontinuities using interpolative smoothing.

38. A method according to claim 35 wherein generating the set of contract valuation risk functions corresponding to the set of contract valuation functions comprises processing the set of contract valuation functions to obtain the contract valuation risk functions by:
   starting at a first valuation function in the ordered list of contract valuation functions and using rules of calculus to compute the one or more partial derivatives of the first valuation function to thereby obtain a set of one or more first contract valuation risk functions corresponding to the first valuation function; and
   moving successively through the ordered list of contract valuation functions using rules of calculus to compute the one or more partial derivatives of each of the contract valuation functions to thereby obtain a set of one or more contract valuation risk functions corresponding to each contract valuation function.

39. A method according to claim 38 wherein the contract valuation risk functions are expressed at least in part by one or more model risk metrics associated with the one or more particular financial models, the one or more model risk metrics associated with the one or more particular financial models selected from among the set of model risk metrics.

40. A method according to claim 27 wherein estimating the expected value for the contract comprises, for a plurality of iterations:
   generating a valuation set which specifies one value for each of the stochastic variables within the set of stochastic variables; and
   evaluating one or more of the contract valuation functions using the valuation set.

41. A method according to claim 40 wherein evaluating the one or more of the contract valuation functions comprises evaluating a subset of the contract valuation functions which includes the ultimate contract valuation function.

42. A method according to claim 40 wherein evaluating the one or more of the contract valuation functions comprises evaluating all of the contract valuation functions.

43. A method according to claim 40 wherein generating the valuation set comprises, for each stochastic variable within the set of stochastic variables, generating a random draw based on a distribution of the stochastic variable, the random draw representing the one value for the stochastic variable within the valuation set.

44. A method according to claim 43 wherein generating the random draw based on the distribution of the stochastic variable comprises: generating a random number u from within a uniform distribution in a range [0,1]; and using the random number u and the distribution of the stochastic variable to generate the random draw.

45. A method according to claim 43 wherein generating the random draw comprises at least one of generating a pseudo random draw and generating a quasi random draw.

46. A method according to claim 43 wherein generating the valuation set comprises, for at least one of the stochastic variables within the set of stochastic variables, modifying the random draw to conform with a serial correlation which specifies how a value of the stochastic variable depends on temporally previous values of the stochastic variable, wherein modifying the random draw to conform with the serial correlation is performed prior to the random draw representing the one value for the stochastic variable within the valuation set.

47. A method according to claim 43 wherein generating the valuation set comprises, for at least one of the stochastic variables within the set of stochastic variables, modifying the random draw to conform with a cross correlation which specifies how a value of the stochastic variable depends on one or more values of another different stochastic variable within the set of stochastic variables, wherein modifying the random draw to conform with the cross correlation is performed prior to the random draw representing the one value for the stochastic variable within the valuation set.

48. A method according to claim 40 wherein estimating the expected value for the contract comprises:
   performing a plurality of iterations of generating a valuation set which specifies one value for each of the stochastic variables within the set of stochastic variables, to thereby generate a plurality of valuation sets; and
   subsequent to generating the plurality of valuation sets, performing a plurality of iterations of evaluating one or more of the contract valuation functions using a corresponding valuation set, to thereby evaluate a plurality of the one or more of the contract valuation functions corresponding to the plurality of valuation sets.

49. A method according to claim 40 wherein estimating the expected value for the contract comprises, for each iteration, accumulating the one or more evaluated contract valuation functions in an accumulation data structure.

50. A method according to claim 49 wherein the accumulation data structure comprises one of:
   an array of records, each record associated with a corresponding valuation set and each record comprising the one or more evaluated contract valuation functions evaluated using the valuation set; and
   a single record comprising, for each of the one or more evaluated contract valuation functions, a sum of the evaluated contract valuation function over all of the valuation sets.

51. A method according to claim 49 wherein the one or more evaluated contract valuation functions comprise the ultimate contract valuation function and wherein estimating the expected value for the contract comprises estimating the expected value of the ultimate contract valuation function to be an average of the evaluated ultimate contract valuation function accumulated, over the plurality of iterations, in the accumulation data structure.

52. A method according to claim 40 wherein estimating the one or more expected values for the risk of the contract comprises, for each of the plurality of iterations, evaluating one or more of the contract valuation risk functions corresponding to the ultimate contract valuation function using the valuation set generated during the iteration.

53. A method according to claim 52 wherein estimating the one or more expected values for the risk of the contract comprises:
   performing a plurality of iterations of generating a valuation set which specifies one value for each of the stochastic variables within the set of stochastic variables, to thereby generate a plurality of valuation sets; and
   subsequent to generating the plurality of valuation sets, performing a plurality of iterations of evaluating one or more of the contract valuation risk functions corresponding to the ultimate contract valuation function using a corresponding valuation set, to thereby evaluate a plurality of the one or more of the contract valuation risk functions corresponding to the ultimate contract valuation function and corresponding to the plurality of valuation sets.

54. A method according to claim 52 wherein estimating the expected value for the contract and estimating the one or more expected values of the risk of the contract comprise, for each iteration, accumulating the one or more evaluated contract valuation functions and the one or more evaluated contract valuation risk functions corresponding to the ultimate contract valuation function in an accumulation data structure.

55. A method according to claim 54 wherein the accumulation data structure comprises one of:
   an array of records, each record associated with a corresponding valuation set and each record comprising the one or more evaluated contract valuation functions and the one or more evaluated contract valuation risk functions corresponding to the ultimate contract valuation function evaluated using the valuation set; and
   a single record comprising:
      for each of the one or more evaluated contract valuation functions, a sum of the evaluated contract valuation function over all of the valuation sets; and
      for each of the one or more evaluated contract valuation risk functions corresponding to the ultimate contract valuation function, a sum of the evaluated contract valuation risk functions corresponding to the ultimate contract valuation function over all of the valuation sets.

56. A method according to claim 54 wherein:
   the one or evaluated contract valuation functions comprise the ultimate contract valuation function;
   estimating the expected value for the contract comprises estimating the expected value of the ultimate contract valuation function to be an average of the evaluated ultimate contract valuation function accumulated, over the plurality of iterations, in the accumulation data structure; and
   estimating the one or more expected values for the risk of the contract comprises estimating the one or more expected value of the one or more contract valuation risk functions corresponding to ultimate contract valuation function to be an average of the one or more evaluated contract valuation risk functions corresponding to the ultimate contract valuation function accumulated, over the plurality of iterations, in the accumulation data structure.

57. A method according to claim 51 comprising estimating a standard deviation of the value of the contract by estimating a standard deviation of the evaluated ultimate contract valuation function accumulated, over the plurality of iterations, in the accumulation data structure.

58. A computer program product comprising a set of instructions embodied on a computer readable medium, the instructions when executed by a processor, cause the processor to perform a method for estimating an expected value of a financial contract, the method comprising:
   receiving observable market data;
   calibrating one or more financial models using the market data to obtain estimates for one or more model parameters corresponding to each of the one or more financial models;
   generating a set of model risk metrics, the set of model risk metrics comprising:
      for each of the one or more financial models, one or more corresponding financial model partial derivative functions representing a rate of change of the financial model with respect to each of its corresponding model parameters; and
      for each of the model parameters, one or more corresponding model parameter partial derivative functions representing a rate of change of the model parameter with respect to each of the market data,
   parsing the contract into a set of contract valuation functions, the set of contract valuation functions depending, at least in part, on a subset of the model parameter estimates and the set of contract valuation functions including an ultimate contract valuation function representative of the value of the contract;
   generating a set of contract valuation risk functions corresponding to the set of contract valuation functions, each of the set of contract valuation risk functions comprising one or more partial derivatives of a corresponding contract valuation function with respect to all inputs to the corresponding contract valuation function;
   estimating an expected value for the contract, the expected value for the contract comprising an expected value for the ultimate contract valuation function; and
   estimating one or more expected values for risk of the contract, each expected value for the risk of the contract comprising an expected value for one of the contract valuation risk functions corresponding to the ultimate contract valuation function.

59. A method for estimating an expected value of a financial contract using a computer system, the method comprising:
   receiving observable market data as input to a computer system;
   calibrating, by the computer system, one or more financial models using the market data to obtain estimates for one or more model parameters corresponding to each of the one or more financial models;
   generating, by the computer system, a set of model risk metrics, the set of model risk metrics comprising:
      for each of the one or more financial models, one or more corresponding financial model partial derivative functions representing a rate of change of the financial model with respect to each of its corresponding model parameters; and for each of the model parameters, one or more corresponding model parameter partial derivative functions representing a rate of change of the model parameter with respect to each of the market data, parsing the contract into a set of contract valuation functions by the computer system, the set of contract valuation functions depending, at least in part, on a subset of the model parameter estimates and the set of contract valuation functions including an ultimate contract valuation function representative of the value of the contract;

generating, by the computer system, a set of contract valuation risk functions corresponding to the set of contract valuation functions, each of the set of contract valuation risk functions comprising one or more partial derivatives of a corresponding contract valuation function with respect to all inputs to the corresponding contract valuation function;

estimating, by the computer system, an expected value for the contract, the expected value for the contract comprising an expected value for the ultimate contract valuation function; and estimating, by the computer system, one or more expected values for risk of the contract, each expected value for the risk of the contract comprising an expected value for one of the contract valuation risk functions corresponding to the ultimate contract valuation function.

* * * * *